United States Patent
Yoshimine

(10) Patent No.: US 9,941,535 B2
(45) Date of Patent: *Apr. 10, 2018

(54) FUEL CELL MODULE

(71) Applicant: HONDA MOTOR CO., LTD., Tokyo (JP)

(72) Inventor: Yuki Yoshimine, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 506 days.

This patent is subject to a terminal disclaimer.

(21) Appl. No.: 14/406,575

(22) PCT Filed: Apr. 26, 2013

(86) PCT No.: PCT/JP2013/062873
§ 371 (c)(1),
(2) Date: Dec. 9, 2014

(87) PCT Pub. No.: WO2013/187154
PCT Pub. Date: Dec. 19, 2013

(65) Prior Publication Data
US 2015/0147669 A1 May 28, 2015

(30) Foreign Application Priority Data

Jun. 12, 2012 (JP) .................................. 2012-132895

(51) Int. Cl.
*H01M 8/06* (2016.01)
*H01M 8/24* (2016.01)
(Continued)

(52) U.S. Cl.
CPC .......... *H01M 8/0618* (2013.01); *C01B 3/384* (2013.01); *H01M 8/04022* (2013.01);
(Continued)

(58) Field of Classification Search
None
See application file for complete search history.

(56) References Cited

U.S. PATENT DOCUMENTS

| 8,125,078 B2 | 2/2012 | Yoshida et al. |
| 2001/0009732 A1 | 7/2001 | Schuler |

(Continued)

FOREIGN PATENT DOCUMENTS

| EP | 2143685 | 1/2010 | |
| EP | 2143685 A1 * | 1/2010 | ............. C01B 3/384 |

(Continued)

OTHER PUBLICATIONS

Japanese Office Action with partial English translation, dated Aug. 11, 2015, 4 pages.
Co-pending U.S. Appl. No. 14/406,572, filed Dec. 9, 2014.
U.S. Office Action dated Feb. 9, 2017 from co-pending U.S. Appl. No. 14/406,572, 31 pages.

*Primary Examiner* — Barbara L Gilliam
*Assistant Examiner* — Zhongqing Wei
(74) *Attorney, Agent, or Firm* — Rankin, Hill & Clark LLP

(57) ABSTRACT

A fuel cell module includes a first area where an exhaust gas combustor and a start-up combustor are provided, an annular second area around the first area where a heat exchanger is provided, an annular third area around the second area where a reformer is provided, an annular fourth area around the third area where an evaporator is provided. A plurality of heat exchange pipes are provided in the heat exchanger around a first partition plate. At least one of the heat exchange pipes has at least one constricted portion.

9 Claims, 25 Drawing Sheets

(51) Int. Cl.
  *H01M 8/04* (2016.01)
  *H01M 8/0612* (2016.01)
  *C01B 3/38* (2006.01)
  *H01M 8/04014* (2016.01)
  *H01M 8/04223* (2016.01)
  *H01M 8/124* (2016.01)

(52) U.S. Cl.
  CPC ..... *H01M 8/04268* (2013.01); *H01M 8/0631* (2013.01); *H01M 8/24* (2013.01); *C01B 2203/0233* (2013.01); *C01B 2203/066* (2013.01); *C01B 2203/0811* (2013.01); *C01B 2203/1258* (2013.01); *C01B 2203/1604* (2013.01); *H01M 2008/1293* (2013.01); *Y02P 20/124* (2015.11)

(56) References Cited

U.S. PATENT DOCUMENTS

2009/0212259 A1\* 8/2009 Noguchi .................. B01J 4/002
  252/373
2010/0021784 A1\* 1/2010 Fourmigue ....... H01M 8/04022
  429/423

FOREIGN PATENT DOCUMENTS

| JP | 2001-236980 | 8/2001 |
| JP | 2004-288434 | 10/2004 |
| JP | 2010-504607 | 2/2010 |
| WO | 2008/084870 | 7/2008 |

\* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive oxide such as stabilized zirconia. The electrolyte is interposed between an anode and a cathode to form an electrolyte electrode assembly, for example, a membrane electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

As a system including this fuel cell stack, for example, a fuel cell battery disclosed in Japanese Laid-Open Patent Publication No. 2001-236980 (hereinafter referred to as conventional technique 1) is known. As shown in FIG. 23, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas to induce partial oxidation reforming, and thereafter the fuel is supplied to the fuel cell stack 1a.

Further, as shown in FIG. 24, a solid oxide fuel cell disclosed in Japanese Laid-Open Patent Publication No. 2010-504607 (PCT) (hereinafter referred to as conventional technique 2) has a heat exchanger 2b including a cell core 1b. The heat exchanger 2b heats the cathode air utilizing waste heat.

Further, as shown in FIG. 25, a fuel cell system disclosed in Japanese Laid-Open Patent Publication No. 2004-288434 (hereinafter referred to as conventional technique 3) includes a first area 1c having a columnar shape extending vertically, and an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, the heat exchanger 3a performs heat exchange in an annular chamber. Therefore, in order to improve the heat efficiency, for example, fins or the like need to be provided additionally to produce a turbulent flow. However, if the fins or the like are provided in the annular chamber, the pressure loss becomes large, and the heat exchange cannot be performed efficiently.

Further, in the conventional technique 2, the heat exchanger 2b has a cylindrical shape, and is made up of a plurality of plates arranged coaxially. In the structure, in order to improve the heat efficiency, for example, fins or the like need to be provided additionally, and the pressure loss is increased.

Further, in the conventional technique 3, in the case where the heat exchange efficiency is not sufficient, it is not possible to improve the heat exchange efficiency and increase the heat transmission area suitably without any changes in the design.

The present invention has been made to solve the problem of this type, and an object of the present invention is to provide a fuel cell module having simple and compact structure which makes it possible to improve the heat exchange efficiency suitably.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising a temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

The fuel cell module includes a first area where the exhaust gas combustor and the start-up combustor are provided, an annular second area around the first area where one of the reformer and the heat exchanger is provided, an annular third area around the second area where another of the reformer and the heat exchanger is provided, and an annular fourth area around the third area where the evaporator is provided.

The heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes connected to the oxygen-containing gas supply chamber at one end, and connected to the oxygen-containing gas discharge chamber at another end, and a combustion gas channel for supplying the combustion gas to a space between the heat exchange pipes. At least one of the heat exchange pipes includes at least one portion where a pipe diameter is changed or a pipe cross sectional area is changed.

In the present invention, the exhaust gas combustor and the start-up combustor are provided in the first area at the center. The annular second area is provided around the first area, and the annular third area is provided around the second area, and the annular fourth area is provided around the third area, successively. In the structure, high temperature equipment with a large heat demand can be provided inside, and low temperature equipment with a small heat demand can be provided outside. Thus, improvement in the heat efficiency is achieved, and thermally self-sustaining operation is facilitated. Further, simple and compact structure is achieved.

Further, in the heat exchanger, the annular oxygen-containing gas supply chamber, the annular oxygen-containing gas discharge chamber, and the plurality of heat exchange pipes are provided as basic structure. Thus, simple structure is achieved easily. Accordingly, the production cost of the heat exchanger is reduced effectively. Further, by changing the volumes of the oxygen-containing gas supply chamber and the oxygen-containing gas discharge chamber, the length, the diameter, and the number of the pipes, the desired operation can be achieved in various operating conditions, and a wider variety of designs become available.

Moreover, the at least one of the heat exchange pipes includes the at least one portion where the pipe diameter is changed or the pipe cross sectional area is changed. In the structure, transition from the laminar flow to the turbulent flow occurs in the oxygen-containing gas flowing through the heat exchange pipe. Accordingly, the quantity of the heat passed from the combustion gas to the oxygen-containing gas is increased, and improvement in the heat exchange efficiency is achieved suitably. The desired heat exchange efficiency can be achieved under control.

DESCRIPTION OF EMBODIMENTS

Figure 1:
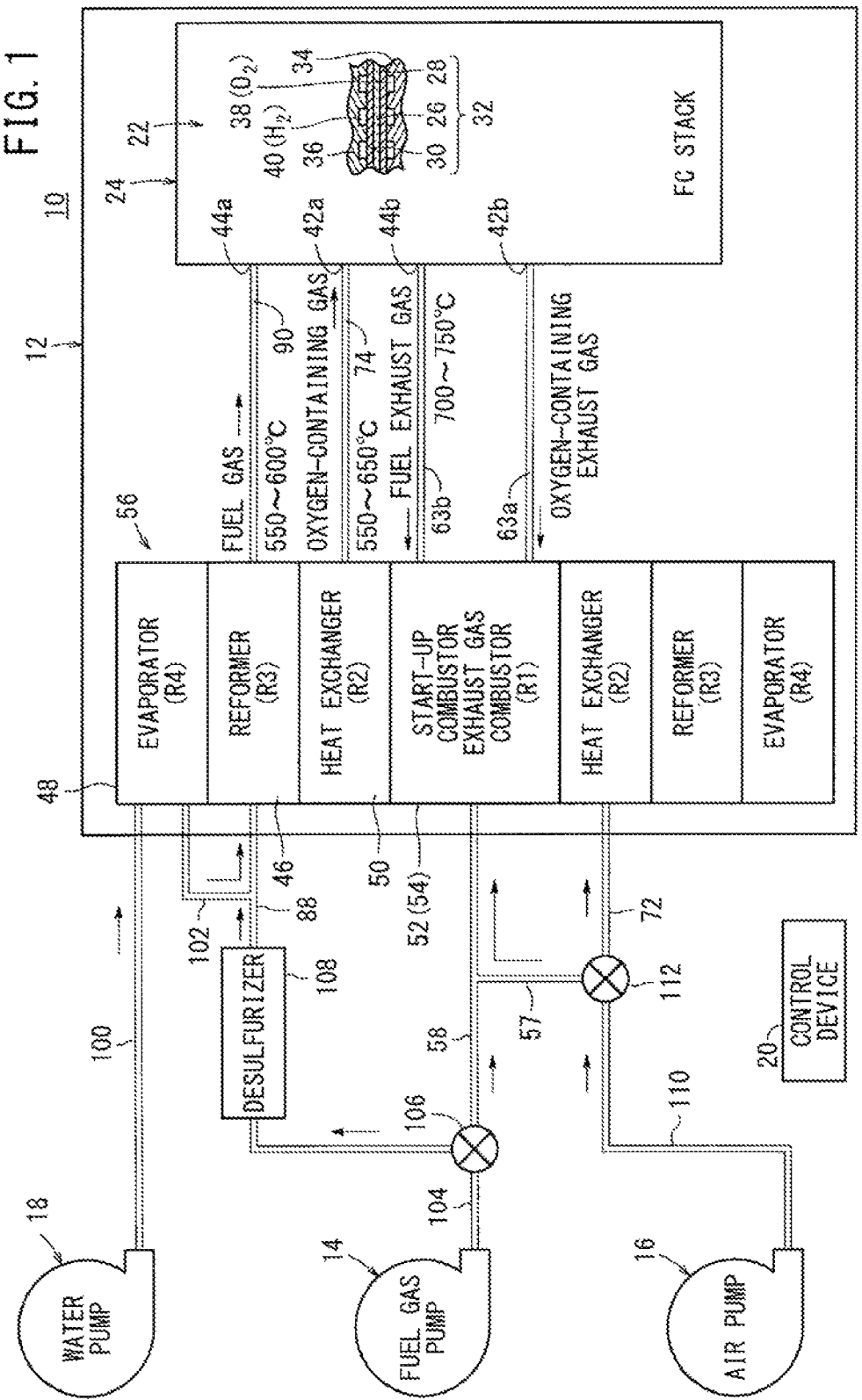
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy (power) generated in the fuel cell module 12.

The fuel cell module 12 includes a fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of water vapor and a raw fuel chiefly containing hydrocarbon (e.g., city gas) to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Basically, the fuel cell module 12 is made up of the fuel cell stack 24 and FC (fuel cell) peripheral equipment 56. The FC peripheral equipment (BOP, Balance of Plant) 56 includes the reformer 46, the evaporator 48, the heat exchanger 50, the exhaust gas combustor 52, and the start-up combustor 54.

Figure 2:
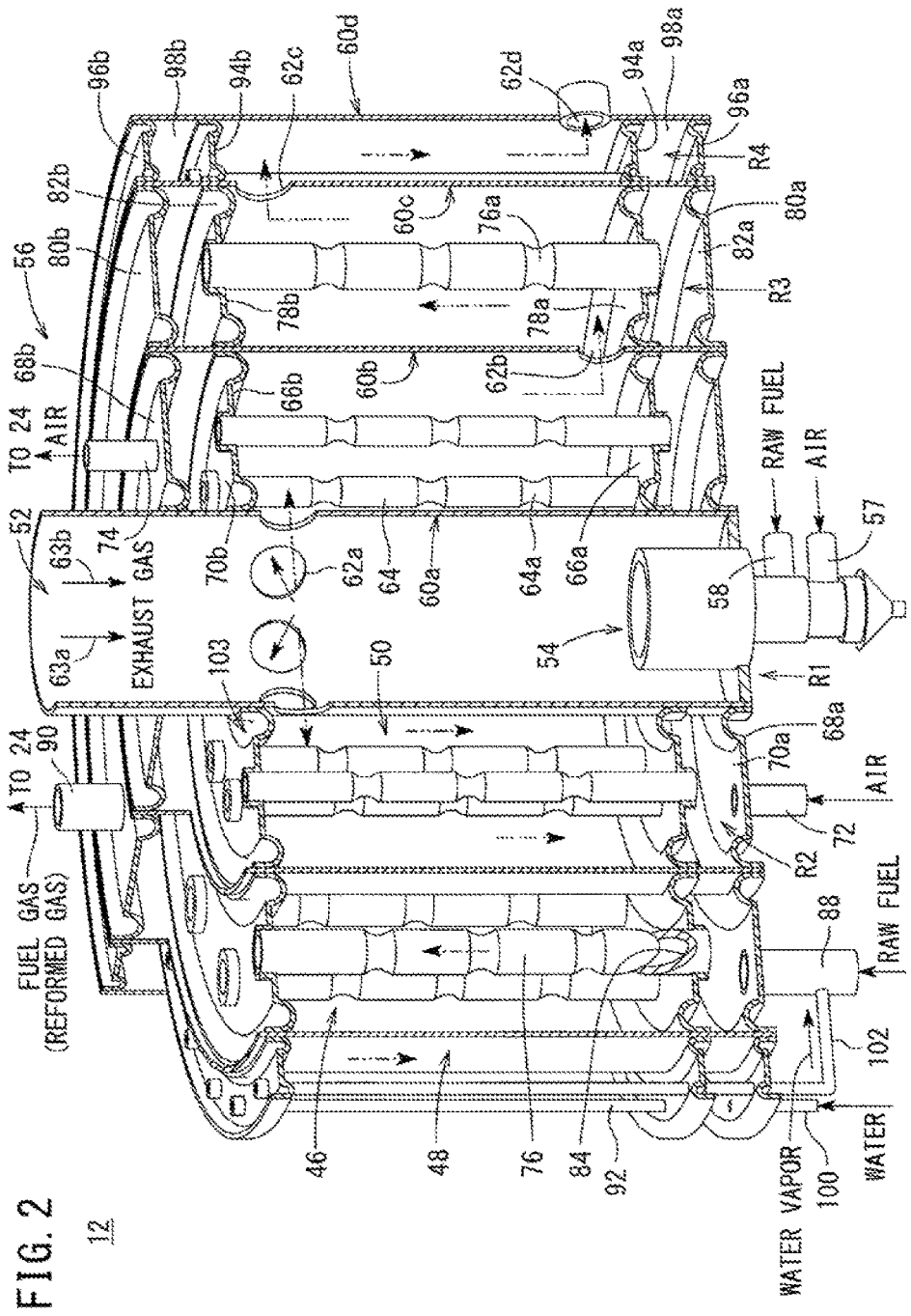
FIG. 2 is a perspective view with partial omission showing FC peripheral equipment of the fuel cell module.

As shown in FIG. 2, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

Figure 3:
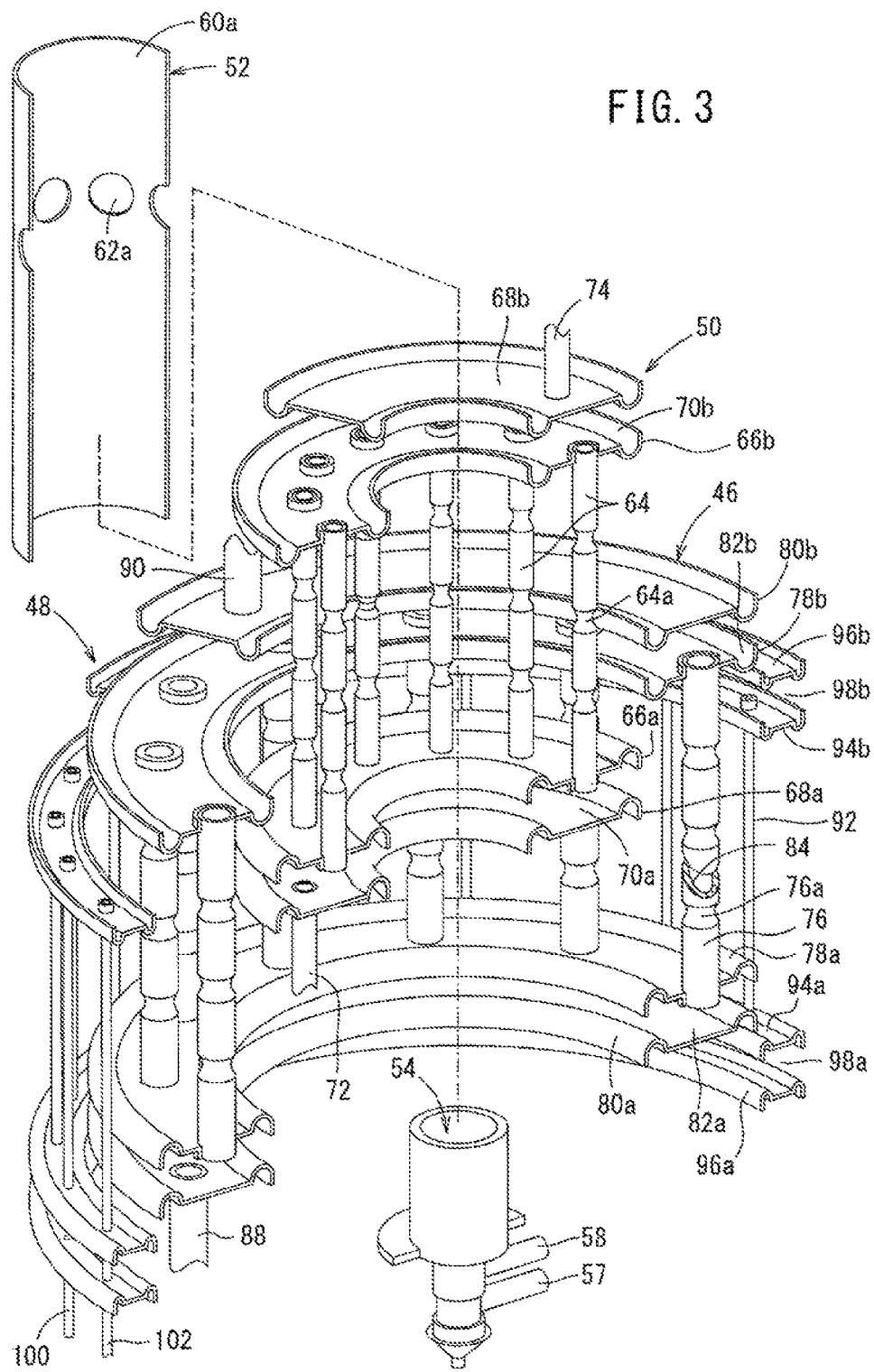
FIG. 3 is an exploded perspective view showing main components of the FC peripheral equipment.

As shown in FIGS. 2 and 3, the start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel.

Figure 4:
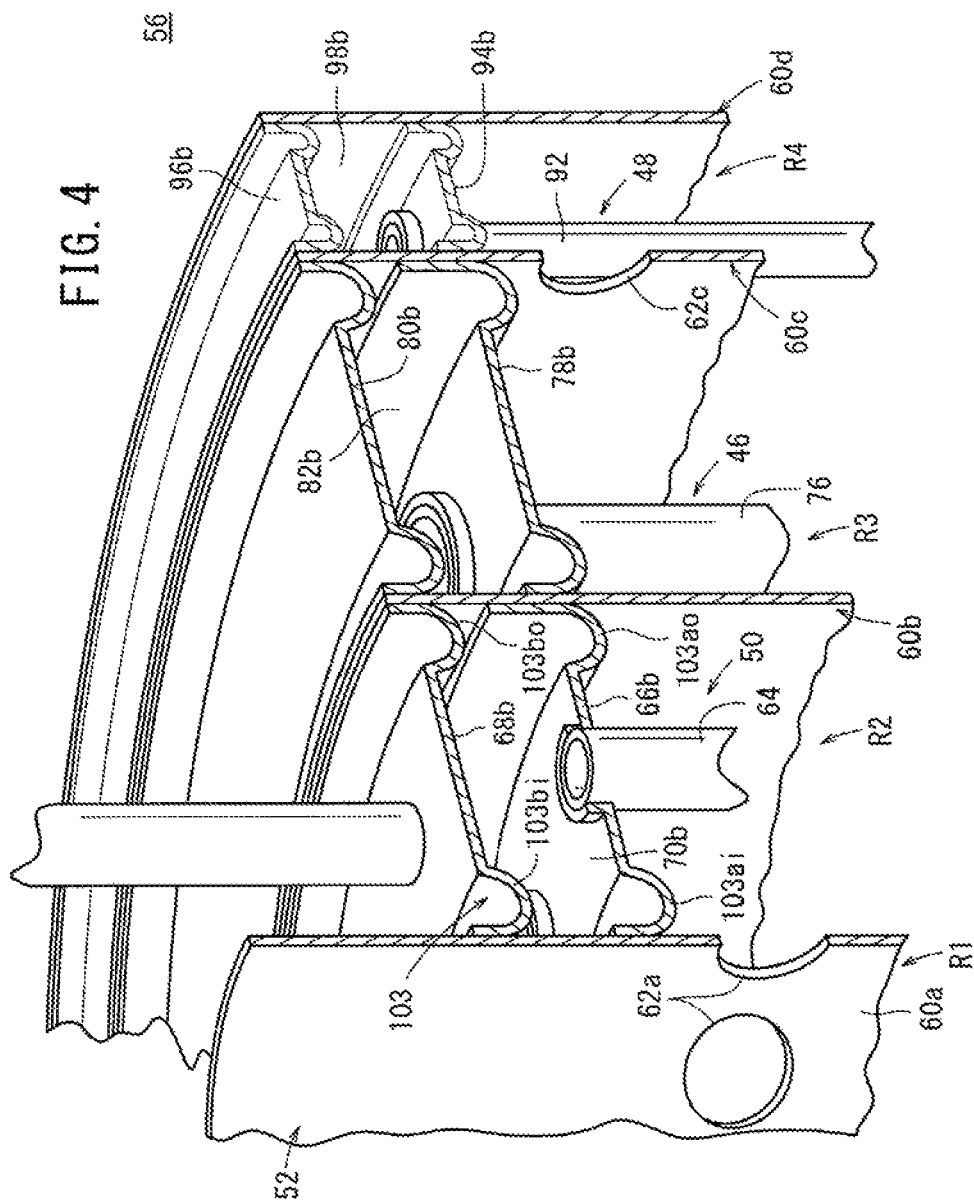
FIG. 4 is an enlarged perspective view showing main components of the FC peripheral equipment.

As shown in FIGS. 2 and 4, the FC peripheral equipment 56 includes a first partition plate 60*a* provided between the first area R1 and the second area R2, a second partition plate 60*b* provided between the second area R2 and the third area R3, and a third partition plate 60*c* provided between the third area R3 and the fourth area R4. A fourth partition plate 60*d* is provided around the fourth area R4. For example, the first partition plate 60*a* to the fourth partition plate 60*d* are made of stainless steel plates.

As shown in FIGS. 2 and 3, the exhaust gas combustor 52 is provided inside the first partition plate 60*a* containing the start-up combustor 54. The first partition plate 60*a* has a cylindrical shape, and a plurality of first combustion gas holes 62*a* are formed along the outer circumferential portion of the first partition plate 60*a*, adjacent to an end of the first partition plate 60*a* closer to the fuel cell stack 24.

A plurality of second combustion gas holes 62*b* are formed adjacent to an end of the second partition plate 60*b* opposite to the fuel cell stack 24. A plurality of third combustion gas holes 62*c* are formed adjacent to an end of the third partition plate 60*c* closer to the fuel cell stack 24. A plurality of fourth combustion gas holes 62*d* are formed adjacent to an end of the fourth partition plate 60*d* opposite to the fuel cell stack 24. The combustion gas is discharged to the outside through the fourth combustion gas holes 62*d*.

One end of an oxygen-containing exhaust gas channel 63*a* and one end of a fuel exhaust gas channel 63*b* are provided at the first partition plate 60*a*. The combustion gas is produced inside the first partition plate 60*a* by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63*a* is connected to the oxygen-containing gas discharge passage 42*b* of the fuel cell stack 24, and the other end of the fuel exhaust gas channel 63*b* is connected to the fuel gas discharge passage 44*b* of the fuel cell stack 24.

As shown in FIGS. 2 and 3, the heat exchanger 50 includes a plurality of heat exchange pipes (heat transmission pipes) 64 provided around the first partition plate 60*a*. The heat exchange pipes 64 are fixed to a first inner ring 66*a* of an oxygen-containing gas supply chamber 70*a* described later at one end (an end opposite to the fuel cell stack 24: hereinafter, in the same manner, the end opposite to the fuel cell stack 24 is referred to as one end), and the heat exchange pipes 64 are fixed to a first inner ring 66*b* of an oxygen-containing gas discharge chamber 70*b* described later at the other end (an end closer to the fuel cell stack 24: hereinafter, in the same manner, the end closer to the fuel cell stack 24 is referred to as the other end).

Figure 5:
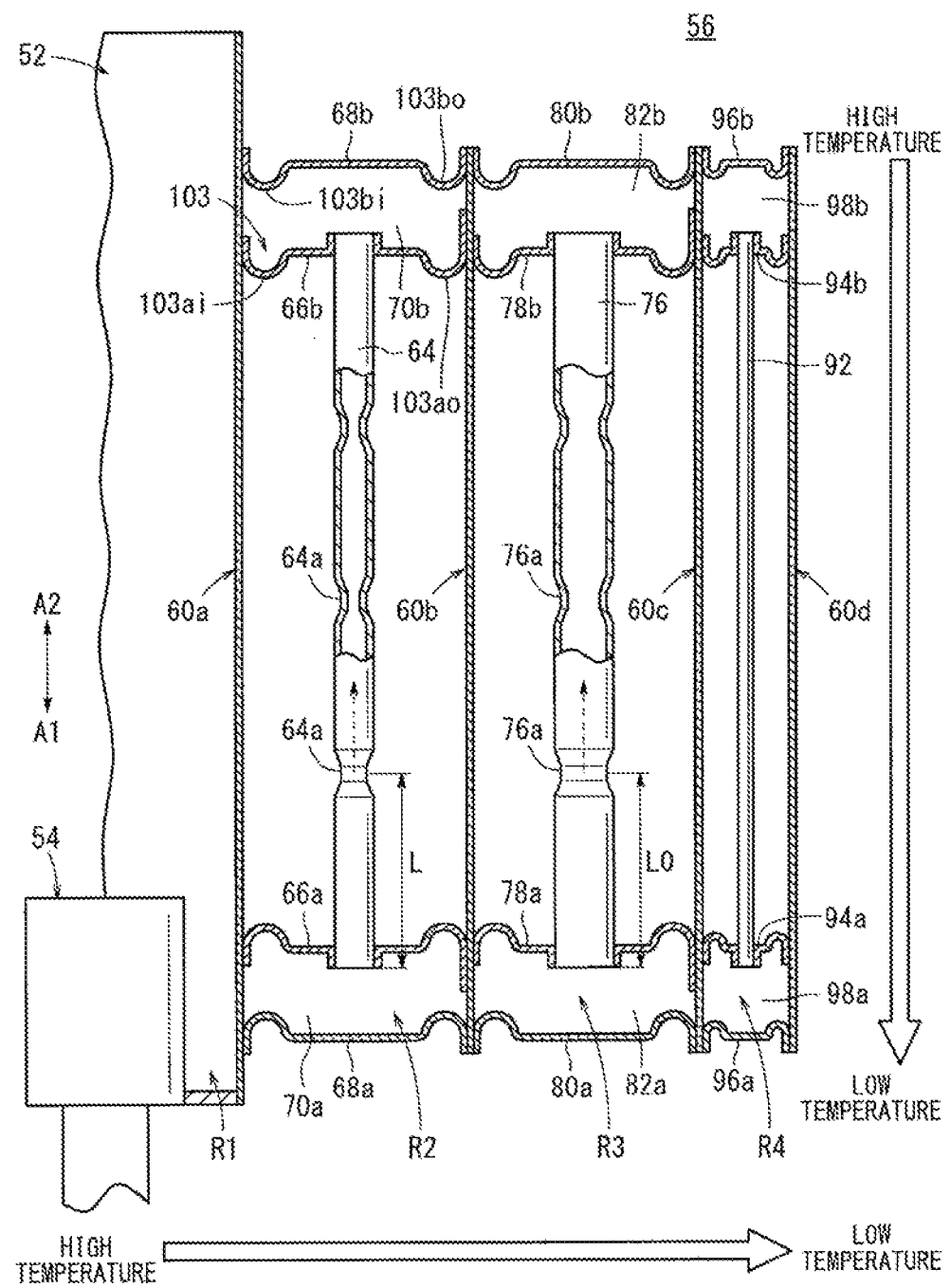
FIG. 5 is a view showing temperature distribution in the FC peripheral equipment.

As shown in FIGS. 2, 3, and 5, at least one of the heat exchange pipes 64 includes at least one constricted portion 64*a* where the pipe diameter is changed or the cross sectional area of the heat exchange pipe 64 is changed. The constricted portion 64*a* is provided by constricting the outer circumferential portion (collapsing the outer circumferential portion) of the heat exchange pipe 64 to form the portion where the pipe diameter is changed or the pipe cross sectional area is changed by reduction of the inner diameter.

In the first embodiment, each of all the heat exchange pipes 64 includes a plurality of constricted portions 64*a*. However, the present invention is not limited in this respect. The constricted portion 64*a* can be provided only in a predetermined heat exchange pipe 64 or predetermined heat exchange pipes 64, or a predetermined number of heat exchange pipes 64 provided at positions where the desired heat exchange efficiency can be obtained.

The constricted portions 64*a* are provided in the same phase (at the same height) in the pipe length direction of the heat exchange pipes 64. Alternatively, the constricted portions 64*a* may be provided in different phases (at different heights) in the pipe length direction, and may be provided spirally in the circumferential direction of the heat exchange pipes 64 by twisting the heat exchange pipes 64 themselves.

The constricted portions 64*a* are provided at predetermined positions in an entrance segment where the flow of the oxygen-containing gas (fluid) is in the middle of developing in the heat exchange pipes 64. As shown in FIG. 5, the constricted portions 64*a* are spaced from the end of the oxygen-containing gas inlet of the heat exchange pipe 64 by the distance L toward the downstream side in the direction indicated by an arrow A2. The distance L is determined to meet a condition: $L \leq 0.065 Re \times d$ where "Re" denotes the Reynolds number and "d" denotes the diameter of the heat exchange pipes 64.

A first outer ring 68*a* is provided outside the first inner ring 66*a*, and a first outer ring 68*b* is provided outside the first inner ring 66*b*. The first inner rings 66*a*, 66*b* and the first outer rings 68*a*, 68*b* are fixed to the outer circumferential surface of the first partition plate 60*a* and the inner circumference surface of the second partition plate 60*b*.

The annular oxygen-containing gas supply chamber 70*a* is formed between the first inner ring 66*a* and the first outer ring 68*a*, and the oxygen-containing gas is supplied to the oxygen-containing gas supply chamber 70*a*. The annular oxygen-containing gas discharge chamber 70*b* is formed between the first inner ring 66*b* and the first outer ring 68*b*, and the heated oxygen-containing gas is discharged to the oxygen-containing gas discharge chamber 70*b* (see FIGS. 2 to 4). Both ends of each of the heat exchange pipes 64 are opened to the oxygen-containing gas supply chamber 70a and the oxygen-containing gas discharge chamber 70b.

As shown in FIGS. 2 and 3, an oxygen-containing gas supply pipe 72 is provided in the oxygen-containing gas supply chamber 70a. One end of an oxygen-containing gas channel 74 is provided in the oxygen-containing gas discharge chamber 70b, and the other end of the oxygen-containing gas channel 74 is connected to the oxygen-containing gas supply passage 42a of the fuel cell stack 24 (see FIG. 1).

The reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is several hundred ° C.

As shown in FIGS. 2 and 3, the reformer 46 includes a plurality of reforming pipes (heat transmission pipes) 76 provided around the heat exchanger 50. The reforming pipes 76 are fixed to a second inner ring 78a at one end, and fixed to a second inner ring 78b at the other end.

As shown in FIGS. 2, 3, and 5, at least one of the reforming pipes 76 includes at least one constricted portion 76a where the pipe diameter is changed or the pipe cross sectional area is changed. The constricted portion 76a is provided by constricting the outer circumferential portion (collapsing the outer circumferential portion) of the reforming pipe 76 to form the portion where the pipe diameter is changed or the pipe cross sectional area is changed by reduction of the inner diameter.

In the first embodiment, each of all the reforming pipes 76 includes a plurality of constricted portions 76a. However, the present invention is not limited in this respect. The constricted portion 76a can be provided only in a predetermined reforming pipe 76 or predetermined reforming pipes 76, or a predetermined number of reforming pipes 76 provided at positions where the desired heat exchange efficiency can be obtained.

The constricted portions 76a are provided in the same phase (at the same height) in the pipe length direction of the reforming pipes 76. Alternatively, the constricted portions 76a may be provided in different phases (at different heights) in the pipe length direction, and may be provided spirally in the circumferential direction of the reforming pipes 76 by twisting the reforming pipes 76 themselves. The constricted portions 76a are provided at predetermined positions in an entrance segment where the flow of the mixed gas (fluid) is in the middle of developing in the reforming pipes 76. As shown in FIG. 5, the constricted portion 76a is spaced from the end of the mixed gas inlet of the reforming pipe 76 by the distance L0 toward the downstream side in the direction indicated by an arrow A2. The distance L0 is determined to meet a condition: $L0 \leq 0.065 Re \times d0$ where "Re" denotes the Reynolds number and "d0" denotes the diameter of the reforming pipes 76.

A second outer ring 80a is provided outside the second inner ring 78a, and a second outer ring 80b is provided outside the second inner ring 78b. The second inner rings 78a, 78b and the second outer rings 80a, 80b are fixed to the outer circumferential surface of the second partition plate 60b and the inner circumferential surface of the third partition plate 60c.

An annular mixed gas supply chamber 82a is formed between the second inner ring 78a and the second outer ring 80a, and a mixed gas of raw fuel and water vapor is supplied to the mixed gas supply chamber 82a. An annular reformed gas discharge chamber 82b is formed between the second inner ring 78b and the second outer ring 80b, and the produced fuel gas (reformed gas) is discharged to the reformed gas discharge chamber 82b. Both ends of each of the reforming pipes 76 are opened to the mixed gas supply chamber 82a and the reformed gas discharge chamber 82b. Reforming catalyst 84 is supported on the inner circumferential surface of each of the reforming pipes 76.

As shown in FIGS. 2 and 3, a raw fuel supply channel 88 is connected to the mixed gas supply chamber 82a, and an evaporation return pipe 102 described later is connected to some part of the raw fuel supply channel 88. One end of a fuel gas channel 90 is connected to the reformed gas discharge chamber 82b, and the other end of the fuel gas channel 90 is connected to the fuel gas supply passage 44a of the fuel cell stack 24 (see FIG. 1).

The evaporator 48 includes a plurality of evaporation pipes (heat transmission pipes) 92 provided around the reformer 46. The evaporation pipes 92 are fixed to a third inner ring 94a at one end, and fixed to a third inner ring 94b at the other end.

A third outer ring 96a is provided outside the third inner ring 94a, and a third outer ring 96b is provided outside the third inner ring 94b. The third inner rings 94a, 94b and the third outer rings 96a, 96b are fixed to the outer circumferential surface of the third partition plate 60c and the inner circumferential surface of the fourth partition plate 60d.

An annular water supply chamber 98a is formed between the third inner ring 94a and the third outer ring 96a, and water is supplied to the water supply chamber 98a. An annular water vapor discharge chamber 98b is formed between the third inner ring 94b and the third outer ring 96b, and water vapor is discharged to the water vapor discharge chamber 98b. Both ends of each of the evaporation pipes 92 are opened to the water supply chamber 98a and the water vapor discharge chamber 98b.

A water channel 100 is connected to the water supply chamber 98a. One end of the evaporation return pipe 102 having at least one evaporation pipe 92 is provided in the water vapor discharge chamber 98b, and the other end of the evaporation return pipe 102 is connected to some part of the raw fuel supply channel 88 (see FIG. 1). The raw fuel supply channel 88 has an ejector function, and generates negative pressure by the flow of the raw fuel for sucking the water vapor.

A stress absorbing section 103 for absorbing the heat stress is provided in at least one of the first area R1, the second area R2, the third area R3, and the fourth area R4 (in particular, in an area which tends to be exposed to high heat).

The stress absorbing section 103 is provided in at least in one of the oxygen-containing gas discharge chamber 70b, the reformed gas discharge chamber 82b, and the water vapor discharge chamber 98b. In the first embodiment, the stress absorbing section 103 is provided in the inner rings 66b, 78b, 94b, and the outer rings 68b, 80b, 96b of all of the oxygen-containing gas discharge chamber 70b, the reformed gas discharge chamber 82b, and the water vapor discharge chamber 98b (see FIG. 4).

Further, the stress absorbing section 103 is provided in at least one of the oxygen-containing gas supply chamber 70a, the mixed gas supply chamber 82a, and the water supply chamber 98a. In the first embodiment, the stress absorbing section 103 is provided in the inner rings 66a, 78a, 94a, and the outer rings 68a, 80a, 96a of all of the oxygen-containing gas supply chamber 70a, the mixed gas supply chamber 82a, and the water supply chamber 98a (see FIG. 2). For example, the inner rings 66a, 66b, 78a, 78b, 94a, 94b and the outer rings 68a, 68b, 80a, 80b, 96a, 96b are made of stainless steels.

In particular, as shown in FIG. 4, in the oxygen-containing gas discharge chamber 70b exposed to the exhaust gas at high temperature, an inner curved section 103ai and an outer curved section 103ao each having a semicircular shape in cross section are provided. In the oxygen-containing gas discharge chamber 70b, in the same manner, an inner curved section 103bi and an outer curved section 103bo each having a semicircular shape in cross section are provided.

Each of the inner curved sections 103ai, 103bi and the outer curved sections 103ao, 103bo functions as a spring having low rigidity for absorbing displacement to form the stress absorbing section 103. It should be noted that only the inner curved sections 103ai, 103bi or only the outer curved sections 103ao, 103bo may be provided. Further, the other inner rings 66a, 78a, 78b, 94a, 94b, and the outer rings 68a, 80a, 80b, 96a, 96b have the same structure as the inner ring 66b and the outer ring 68b, and the detailed description thereof is omitted.

As shown in FIG. 1, the raw fuel supply apparatus 14 includes a raw fuel channel 104. The raw fuel channel 104 is branched into the raw fuel supply channel 88 and the raw fuel supply pipe 58 through a raw fuel regulator valve 106. A desulfurizer 108 for removing sulfur compounds in the city gas (raw fuel) is provided in the raw fuel supply channel 88.

The oxygen-containing gas supply apparatus 16 includes an oxygen-containing gas channel 110. The oxygen-containing gas channel 110 is branched into the oxygen-containing gas supply pipe 72 and the air supply pipe 57 through an oxygen-containing gas regulator valve 112. The water supply apparatus 18 is connected to the evaporator 48 through the water channel 100.

Figure 6:
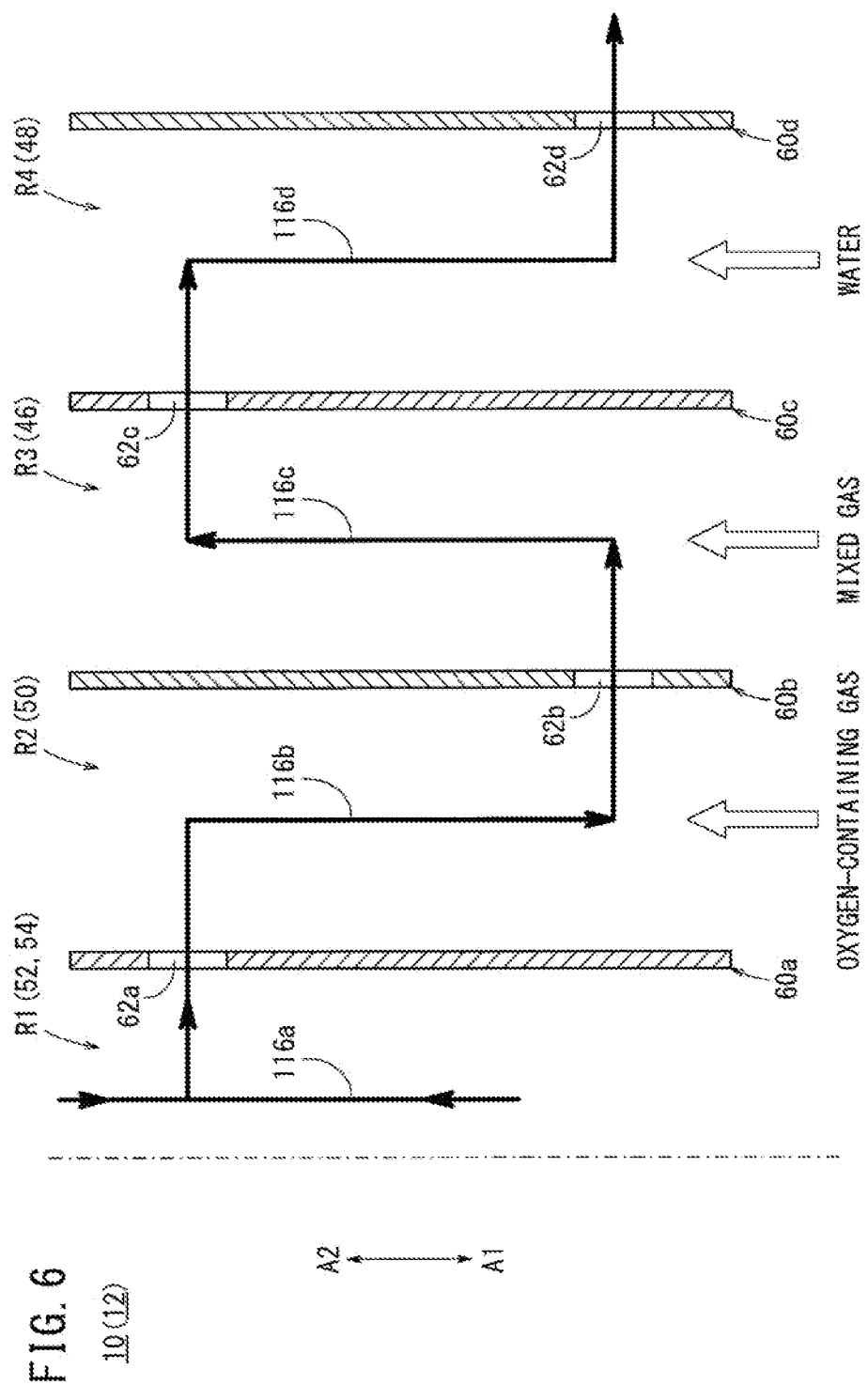
FIG. 6 is a view showing gas flows of a combustion gas in the FC peripheral equipment.

As schematically shown in FIG. 6, a first combustion gas channel 116a as a passage of the combustion gas in the direction indicated by an arrow A is formed in the first area R1, a second combustion gas channel 116b as a passage of the combustion gas in a direction indicated by an arrow A1 is formed in the second area R2, a third combustion gas channel 116c as a passage of the combustion gas in the direction indicated by the arrow A2 is formed in the third area R3, and a fourth combustion gas channel 116d as a passage of the combustion gas in the direction indicated by the arrow A1 is formed in the fourth area R4.

Next, operation of the fuel cell system 10 will be described below.

At the time of starting operation of the fuel cell system 10, the air (oxygen-containing gas) and the raw fuel are supplied to the start-up combustor 54. In the oxygen-containing gas supply apparatus 16, specifically, by operation of the air pump, air is supplied to the oxygen-containing gas channel 110. By adjusting the opening angle of the oxygen-containing gas regulator valve 112, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 104. By regulating the opening angle of the raw fuel regulator valve 106, the raw fuel is supplied into the raw fuel supply pipe 58. The raw fuel is mixed with the air, and supplied into the start-up combustor 54 (see FIG. 2).

Thus, the mixed gas of the raw fuel and the air is supplied into the start-up combustor 54, and the mixed gas is ignited to start combustion. Therefore, in the exhaust gas combustor 52 directly connected to the start-up combustor 54, the combustion gas from the start-up combustor 54 flows into the first partition plate 60a.

As shown in FIG. 6, a plurality of first combustion gas holes 62a are formed at the end of the first partition plate 60a closer to the fuel cell stack 24. Thus, the combustion gas supplied into the first partition plate 60a passes through the first combustion gas holes 62a, and the combustion gas flows from the first area R1 to the second area R2.

In the second area R2, the combustion gas flows in the direction indicated by the arrow A1, and then, the combustion gas flows through the second combustion gas holes 62b formed in the second partition plate 60b into the third area R3. In the third area R3, the combustion gas flows in the direction indicated by the arrow A2, and then, the combustion gas flows through the third combustion gas holes 62c formed in the third partition plate 60c into the fourth area R4. In the fourth area R4, the combustion gas flows in the direction indicated by the arrow A1, and then, the combustion gas is discharged to the outside from the fourth combustion gas holes 62d formed in the fourth partition plate 60d.

The heat exchanger 50 is provided in the second area R2, the reformer 46 is provided in the third area R3, and the evaporator 48 is provided in the fourth area R4. Thus, the combustion gas discharged from the first area R1 heats the heat exchanger 50, then, heats the reformer 46, and then, heats the evaporator 48.

Then, after the temperature of the fuel cell module 12 is raised to a predetermined temperature, the oxygen-containing gas is supplied to the heat exchanger 50, and the mixed gas of the raw fuel and the water vapor is supplied to the reformer 46.

Specifically, the opening angle of the oxygen-containing gas regulator valve 112 is adjusted such that the flow rate of the air supplied to the oxygen-containing gas supply pipe 72 is increased, and the opening angle of the raw fuel regulator valve 106 is adjusted such that the flow rate of the raw fuel supplied to the raw fuel supply channel 88 is increased. Further, by operation of the water supply apparatus 18, the water is supplied to the water channel 100.

Thus, as shown in FIGS. 2 and 3, the air which flowed into the heat exchanger 50 is temporarily supplied to the oxygen-containing gas supply chamber 70a. While the air is moving inside the heat exchange pipes 64, the air is heated by heat exchange with the combustion gas supplied into the second area R2. After the heated air is temporarily supplied to the oxygen-containing gas discharge chamber 70b, the air is supplied to the oxygen-containing gas supply passage 42a of the fuel cell stack 24 through the oxygen-containing gas channel 74 (see FIG. 1).

In the fuel cell stack 24, after the heated air flows through the oxygen-containing gas flow field 38, the oxygen-containing gas (air) is discharged from the oxygen-containing gas discharge passage 42b into the oxygen-containing exhaust gas channel 63a. The oxygen-containing exhaust gas channel 63a is opened to the inside of the first partition plate 60a of the exhaust gas combustor 52, and the oxygen-containing exhaust gas flows into the first partition plate 60a.

Further, as shown in FIG. 1, the water from the water supply apparatus 18 is supplied to the evaporator 48. After sulfur is removed from the raw fuel at the desulfurizer 108, the raw fuel flows through the raw fuel supply channel 88, and moves toward the reformer 46.

In the evaporator 48, after the water is temporarily supplied to the water supply chamber 98a, while water is moving inside the evaporation pipes 92, the water is heated by the combustion gas flowing through the fourth area R4, and vaporized. After the water vapor flows into the water vapor discharge chamber 98b, the water vapor is supplied to the evaporation return pipe 102 connected to the water vapor discharge chamber 98b. Thus, the water vapor flows inside the evaporation return pipe 102, and flows into the raw fuel supply channel 88. Then, the water vapor is mixed with the raw fuel to produce the mixed gas.

The mixed gas from the raw fuel supply channel 88 is temporarily supplied to the mixed gas supply chamber 82a of the reformer 46. The mixed gas moves inside the reforming pipes 76. In the meanwhile, the mixed gas is heated by the combustion gas flowing through the third area R3. By the reforming catalyst 84, steam reforming is performed. After removal (reforming) of hydrocarbon of $C_{2+}$, a reformed gas chiefly containing methane is obtained.

After this reformed gas is heated, the reformed gas is temporarily supplied to the reformed gas discharge chamber 82b as the heated fuel gas. Thereafter, the fuel gas is supplied to the fuel gas supply passage 44a of the fuel cell stack 24 through the fuel gas channel 90 (see FIG. 1).

In the fuel cell stack 24, after the heated fuel gas flows through the fuel gas flow field 40, the fuel gas is discharged from the fuel gas discharge passage 44b into the fuel exhaust gas channel 63b. The fuel exhaust gas channel 63b is opened to the inside of the first partition plate 60a of the exhaust gas combustor 52, and the fuel exhaust gas is supplied into the first partition plate 60a.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the first partition plate 60a.

In the first embodiment, the FC peripheral equipment 56 includes the first area R1 where the exhaust gas combustor 52 and the start-up combustor 54 are provided, the annular second area R2 around the first area R1 where the heat exchanger 50 is provided, the annular third area R3 around the second area R2 where the reformer 46 is provided, and the annular fourth area R4 around the third area R3 where the evaporator 48 is provided.

That is, the first area R1 is provided at the center, the annular second area R2 is provided around the first area R1, and the annular third area R3 is provided around the second area R2, and the annular fourth area R4 is provided around the third area R3, successively. In the structure, high temperature equipment with a large heat demand such as the heat exchanger 50 (and the reformer 46) can be provided inside, and low temperature equipment with a small heat demand such as the evaporator 48 can be provided outside.

For example, the heat exchanger 50 requires the temperature in a range of 550° C. to 650° C., and the reformer 46 requires the temperature in a range of 550° C. to 600° C. The evaporator 48 requires the temperature in a range of 150° C. to 200° C.

Thus, improvement in the heat efficiency is achieved, and thermally self-sustaining operation is facilitated. Further, simple and compact structure is achieved. In particular, since the heat exchanger 50 is provided inside the reformer 46, in an environment where the A/F (air/fuel gas) ratio is relatively low, the reformer 46 suitable for reforming at low temperature can be used advantageously. Thermally self-sustaining operation herein means operation where the operating temperature of the fuel cell 22 is maintained using only heat energy generated in the fuel cell 22, without supplying additional heat from the outside.

The heat exchanger 50 includes the annular oxygen-containing gas supply chamber 70a, the annular oxygen-containing gas discharge chamber 70b, the heat exchange pipes 64, and the second combustion gas channel 116b. The oxygen-containing gas is supplied to the oxygen-containing gas supply chamber 70a, and the heated oxygen-containing gas is discharged to the oxygen-containing gas discharge chamber 70b. The heat exchange pipes 64 are connected to the oxygen-containing gas supply chamber 70a at one end, and connected to the oxygen-containing gas discharge chamber 70b at the other end. The second combustion gas channel 116b supplies the combustion gas into the space between the heat exchange pipes 64.

Thus, the structure of the heat exchanger 50 is simplified easily, and the production cost is reduced effectively. Further, by changing the volumes of the oxygen-containing gas supply chamber 70a and the oxygen-containing gas discharge chamber 70b, the length, the diameter, and the number of the pipes, the desired operation can be achieved in various operating conditions, and a wider variety of designs become available.

Further, in the first embodiment, in the heat exchanger 50, at least one of the heat exchange pipes 64 includes at least one constricted portion 64a where the pipe diameter is changed or the pipe cross sectional area is changed.

Figure 7:
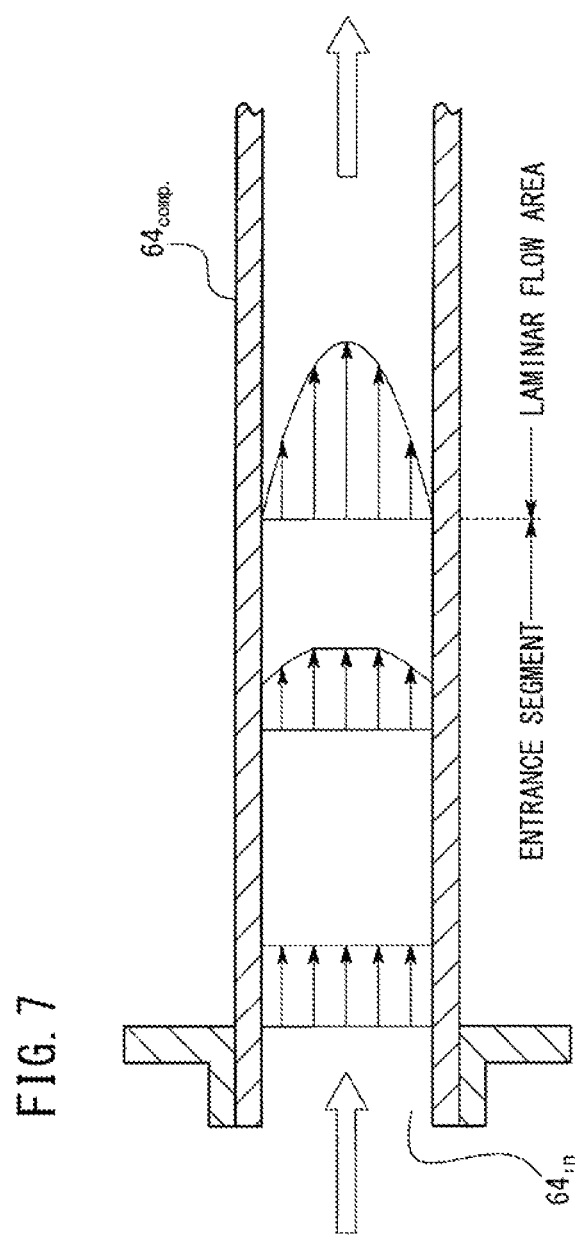
FIG. 7 is a view showing generation of a laminar flow in a heat exchange pipe having a constant inner diameter.
Figure 8:
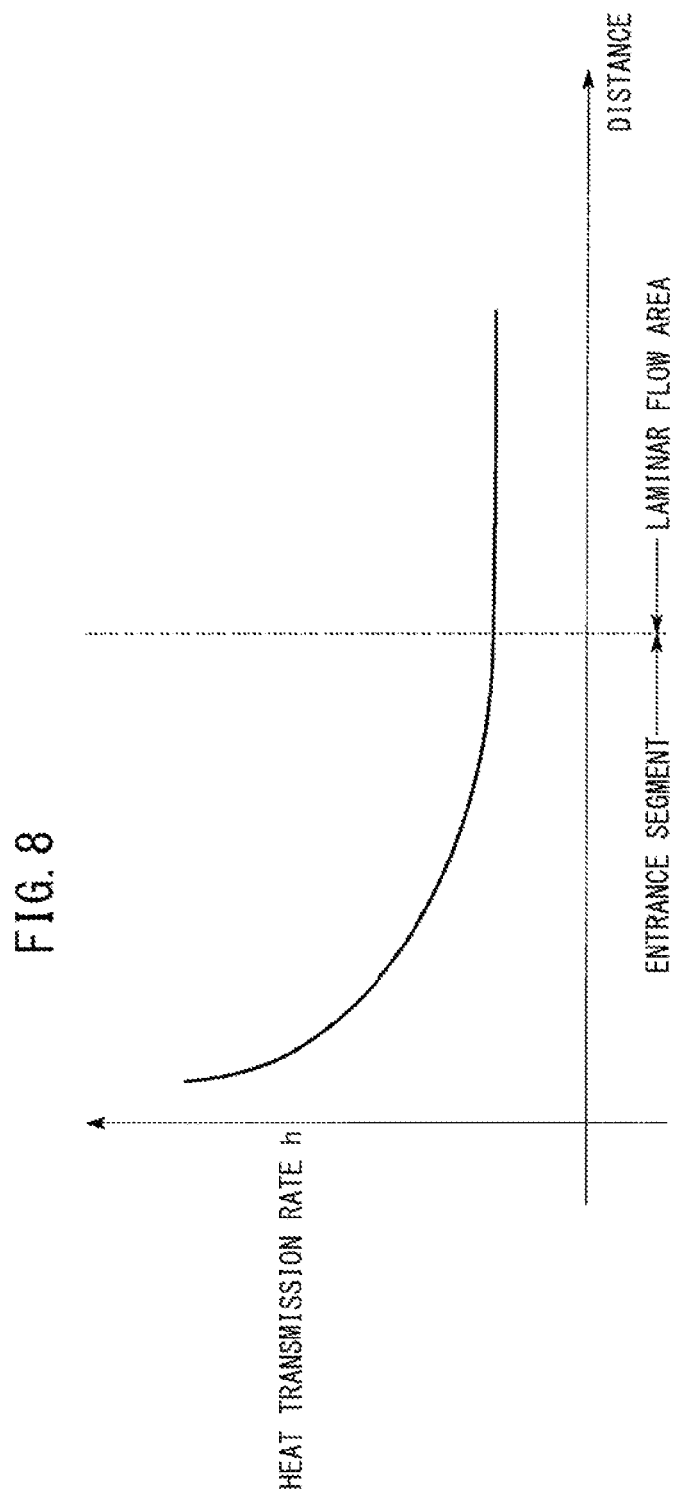
FIG. 8 is a view showing heat transmission efficiency in the heat exchange pipe in FIG. 7.

As shown in FIG. 7, in a circular heat exchange pipe $64_{comp}$, without any constricted portions 64a, an entrance segment is present before a certain flow rate distribution in flow of the oxygen-containing gas from a pipe inlet $64_{in}$ is obtained (before the flow of the oxygen-containing gas becomes a developed flow). As shown in FIG. 8, in the entrance segment, the heat transmission rate is significantly low. After the entrance segment, a laminar flow area having the certain flow rate distribution is present. In the laminar flow area, the heat transmission rate is low.

Figure 9:
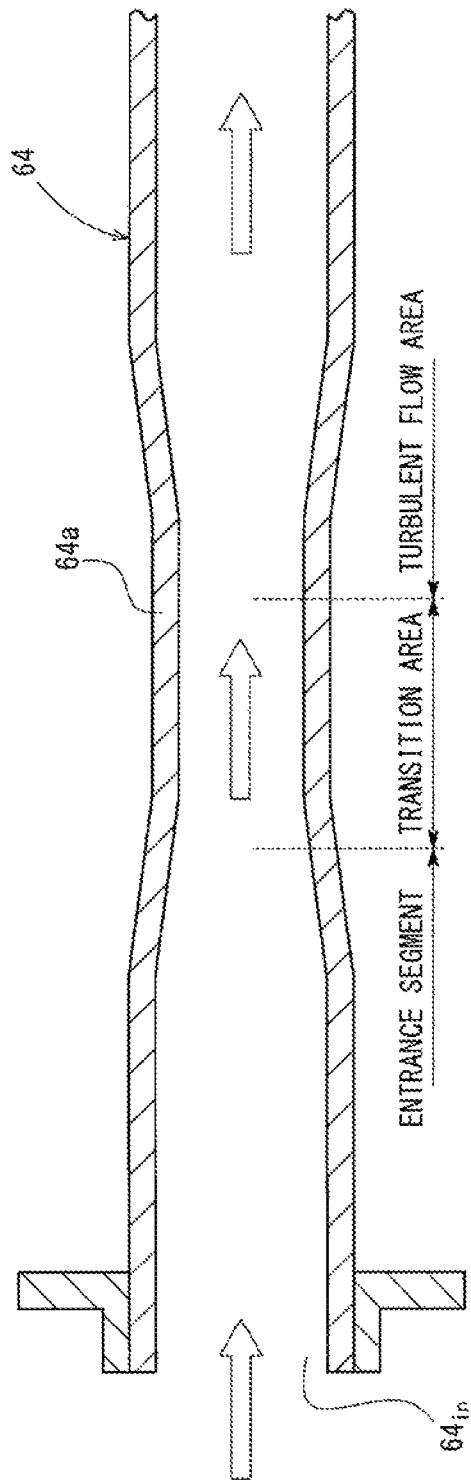
FIG. 9 is a view showing generation of a turbulent flow in the heat exchange pipe according to the first embodiment.
Figure 10:
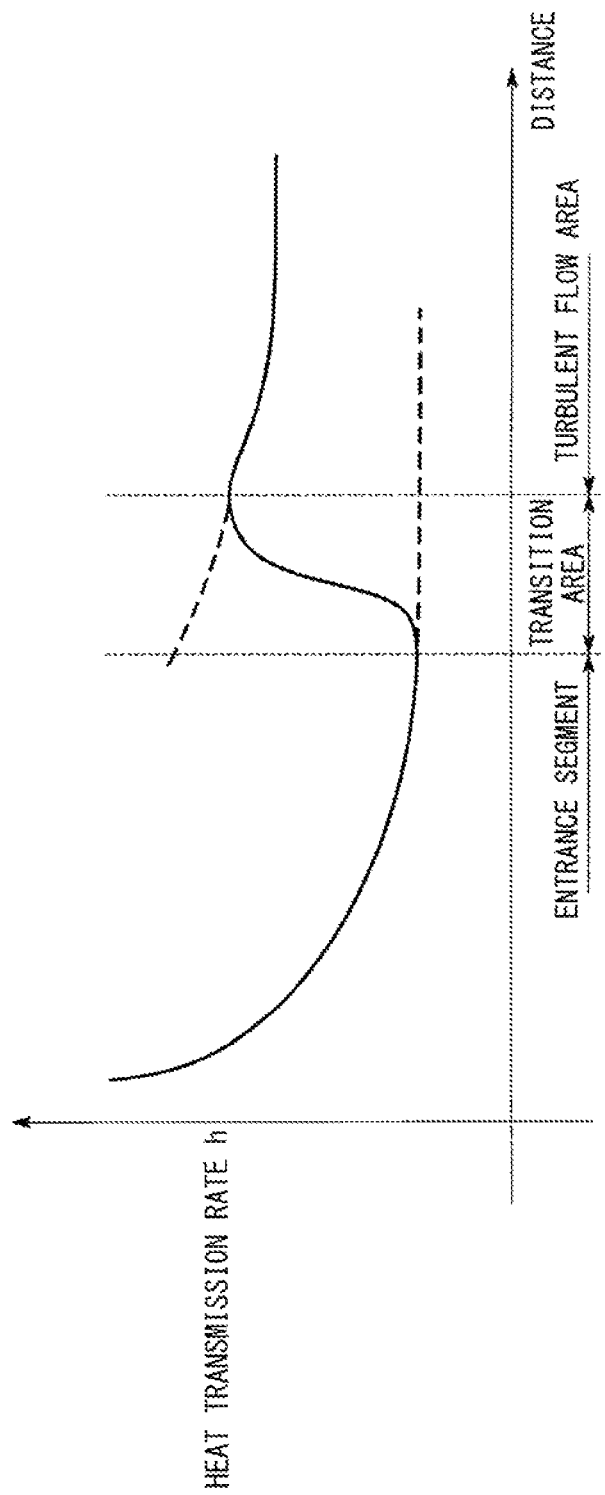
FIG. 10 is a graph showing the heat transmission efficiency in the heat exchange pipe in FIG. 9.

In the first embodiment, in the heat exchange pipe 64, the constricted portion 64a is positioned before the laminar flow area. In particular, the constricted portion 64a is provided within the entrance segment in the heat exchange pipe 64. Thus, as shown in FIG. 9, in some part of the entrance segment from the pipe inlet $64_{in}$, after transition area appears in the pipe through the constricted portion 64a, transition to a turbulent flow area occurs. Therefore, as shown in FIG. 10, the heat transmission rate increases sharply from the transition area, and the high heat transmission rate can be maintained.

Thus, in the first embodiment, transition of the flow of the oxygen-containing gas in the heat exchange pipe 64 occurs from the laminar flow (entrance segment) to the turbulent flow. Accordingly, the quantity of the heat passed from the combustion gas to the oxygen-containing gas is increased, and improvement in the heat exchange efficiency is achieved suitably. Also, the desired heat exchange efficiency can be achieved under control.

Moreover, the constricted portions 64a can be provided in any of the heat exchange pipes 64, and the number of the constricted portions 64a can be determined from variety of choices. Therefore, the heat exchange efficiency of the entire heat exchanger 50 can be adjusted to the desired heat exchange efficiency.

Further, for example, the constricted portions 64a can be provided spirally in the circumferential direction of the heat exchange pipes 64 by twisting the heat exchange pipes 64. In the structure, positions where transition from the laminar flow to the turbulent flow occurs in the oxygen-containing gas flowing through the heat exchange pipe is distributed, and non-uniform flow of the combustion gas is suppressed.

Accordingly, the quantity of the heat passed from the combustion gas to the oxygen-containing gas is increased, the number of positions where the heat can be passed from the combustion gas to the oxygen-containing gas is increased, and improvement in the heat exchange efficiency is achieved effectively.

In the reformer 46, at least one of the reforming pipes 76 includes at least one constricted portion 76a where the pipe diameter is changed or the pipe cross sectional area is changed. The constricted portion 76a is provided in the entrance segment of the reforming pipe 76. In the structure, transition from the laminar flow (entrance segment) to the turbulent flow occurs rapidly in the flow of the mixed gas in the reforming pipe 76. Accordingly, the quantity of the heat passed from the combustion gas to the mixed gas is increased, and improvement in the heat exchange efficiency is achieved suitably. Further, for example, by selecting the positions and the number of constricted portions 76a, the desired heat exchange efficiency can be achieved under control.

Further, for example, the constricted portions 76a can be provided spirally in the circumferential direction of the reforming pipes 76 by twisting the reforming pipes 76. In the structure, positions where transition from the laminar flow to the turbulent flow occurs in the mixed gas flowing through the reforming pipe 76 is distributed, and non-uniform flow of the combustion gas is suppressed. Accordingly, the quantity of the heat passed from the combustion gas to the mixed gas is increased, the number of positions where the heat can be passed from the combustion gas to the oxygen-containing gas is increased, and improvement in the heat exchange efficiency is achieved effectively.

Further, in the first embodiment, as shown in FIGS. 2, 3, and 6, the reformer 46 includes the annular mixed gas supply chamber 82a, the annular reformed gas discharge chamber 82b, the reforming pipes 76, and the third combustion gas channel 116c. The mixed gas is supplied to the mixed gas supply chamber 82a, and the produced fuel gas is discharged to the reformed gas discharge chamber 82b. The reforming pipes 76 are connected to the mixed gas supply chamber 82a at one end, and connected to the reformed gas discharge chamber 82b at the other end. The third combustion gas channel 116c supplies the combustion gas into the space between the reforming pipes 76.

Thus, the structure of the reformer 46 is simplified easily, and the production cost is reduced effectively. Further, by changing the volumes of the mixed gas supply chamber 82a and the reformed gas discharge chamber 82b, the length, the diameter, and the number of the pipes, the desired operation can be achieved in various operating conditions, and a wider variety of designs become available.

The combustion gas flows through the first combustion gas channel 116a of the first area R1, the second combustion gas channel 116b of the second area R2, the third combustion gas channel 116c of the third area R3, and the fourth combustion gas channel 116d of the fourth area R4. Thereafter, the combustion gas is discharged to the outside of the fuel cell module 12.

In the structure, blow-through of the combustion gas can be suppressed, and it becomes possible to effectively supply the heat to the exhaust gas combustor 52, the heat exchanger 50, the reformer 46, and the evaporator 48 of the FC peripheral equipment 56 effectively. Accordingly, improvement in the heat efficiency is achieved, and thermally self-sustaining operation is facilitated reliably. Thermally self-sustaining operation herein means operation where the operating temperature of the fuel cell 22 is maintained using only heat energy generated in the fuel cell 22, without supplying additional heat from the outside.

Further, the positions of the first combustion gas hole 62a, the second combustion gas hole 62b, and the third combustion gas hole 62c can be determined depending on the priorities such as the heat efficiency, durability, and size reduction in the second area R2, the third area R3, and the fourth area R4. Accordingly, the target heat exchange efficiency can be determined freely, and a wider variety of designs become available.

Moreover, the fuel cell module 12 is a solid oxide fuel cell module. Therefore, the fuel cell module 12 is particularly suitable for high temperature type fuel cells such as SOFC.

Figure 11:
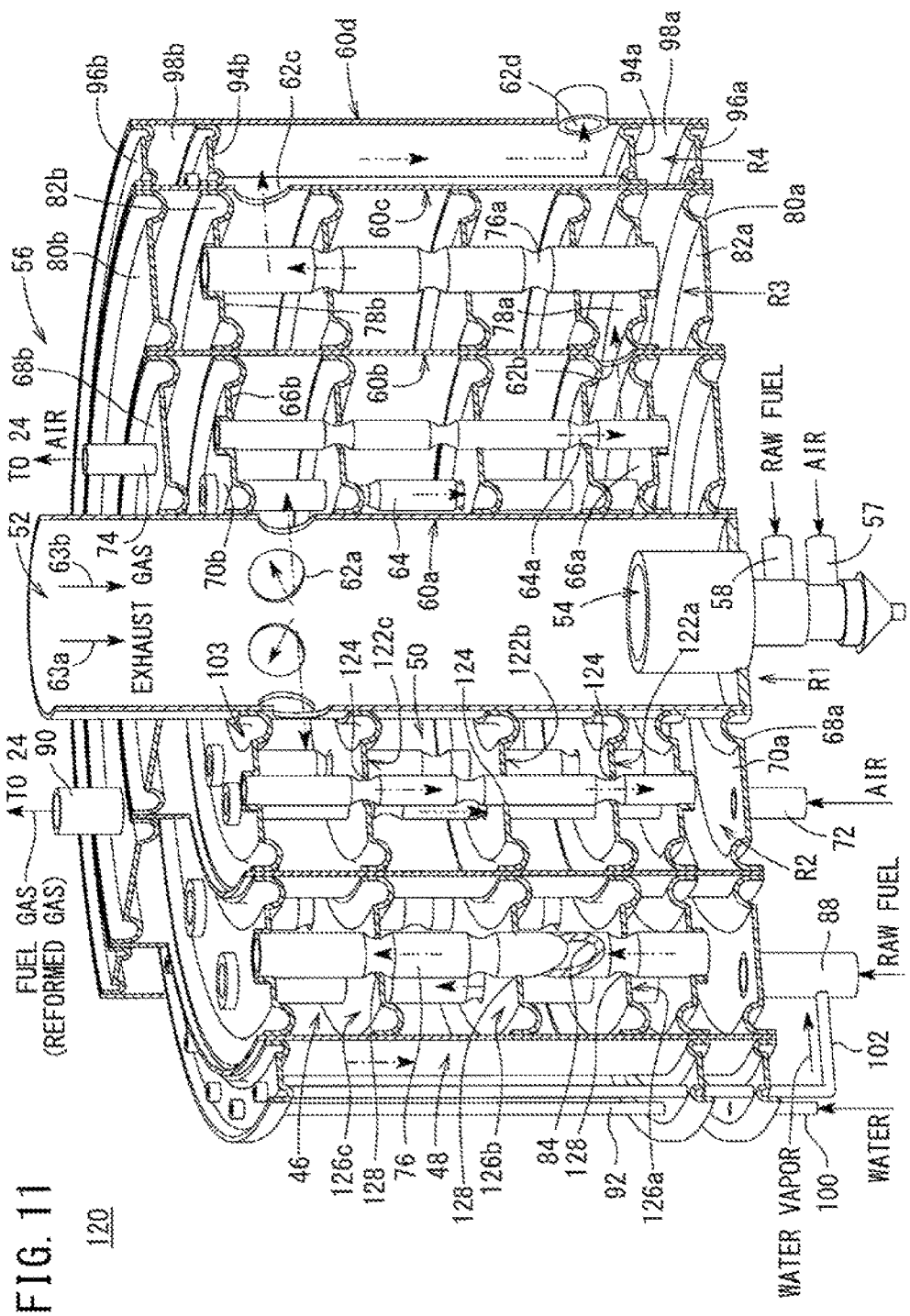
FIG. 11 is a perspective view with partial omission showing FC peripheral equipment of a fuel cell module according to a second embodiment.

FIG. 11 is a perspective view with partial omission showing FC peripheral equipment 56 of a fuel cell module 120 according to a second embodiment of the present invention. The constituent elements of the fuel cell module 120 according to the second embodiment of the present invention that are identical to those of the fuel cell module 12 according to the first embodiment are labeled with the same reference numerals, and descriptions thereof will be omitted. Also in a third or other succeeding embodiments described later, the constituent elements that are identical to those of the fuel cell module 12 according to the first embodiment are labeled with the same reference numerals, and descriptions thereof will be omitted.

In the fuel cell module 120, heat exchange pipes 64 of the heat exchanger 50 include constricted portions 64a, respectively, and the constricted portions 64a of the adjacent heat exchange pipes 64 are in different phases (at different heights). The constricted portions 64a may be twisted.

Reforming pipes 76 of the reformer 46 include constricted portions 76a, respectively, and the constricted portions 76a of the adjacent reforming pipes 76 are in different phases (at different heights). The constricted portions 76a may be twisted.

At least one, in the second embodiment, three baffle plates 122a, 122b, 122c forming a combustion gas detour channel are provided in the second area R2 (second combustion gas channel 116b) where the heat exchanger 50 is provided, between first inner rings 66a, 66b in a direction perpendicular to the pipe length direction of the heat exchange pipes 64. The baffle plates 122a to 122c have a substantially ring shape, and fixed to the outer circumferential surface of the first partition plate 60a and the inner circumferential surface of the second partition plate 60b, and have the same structure as the first inner ring 66a.

Figure 12:
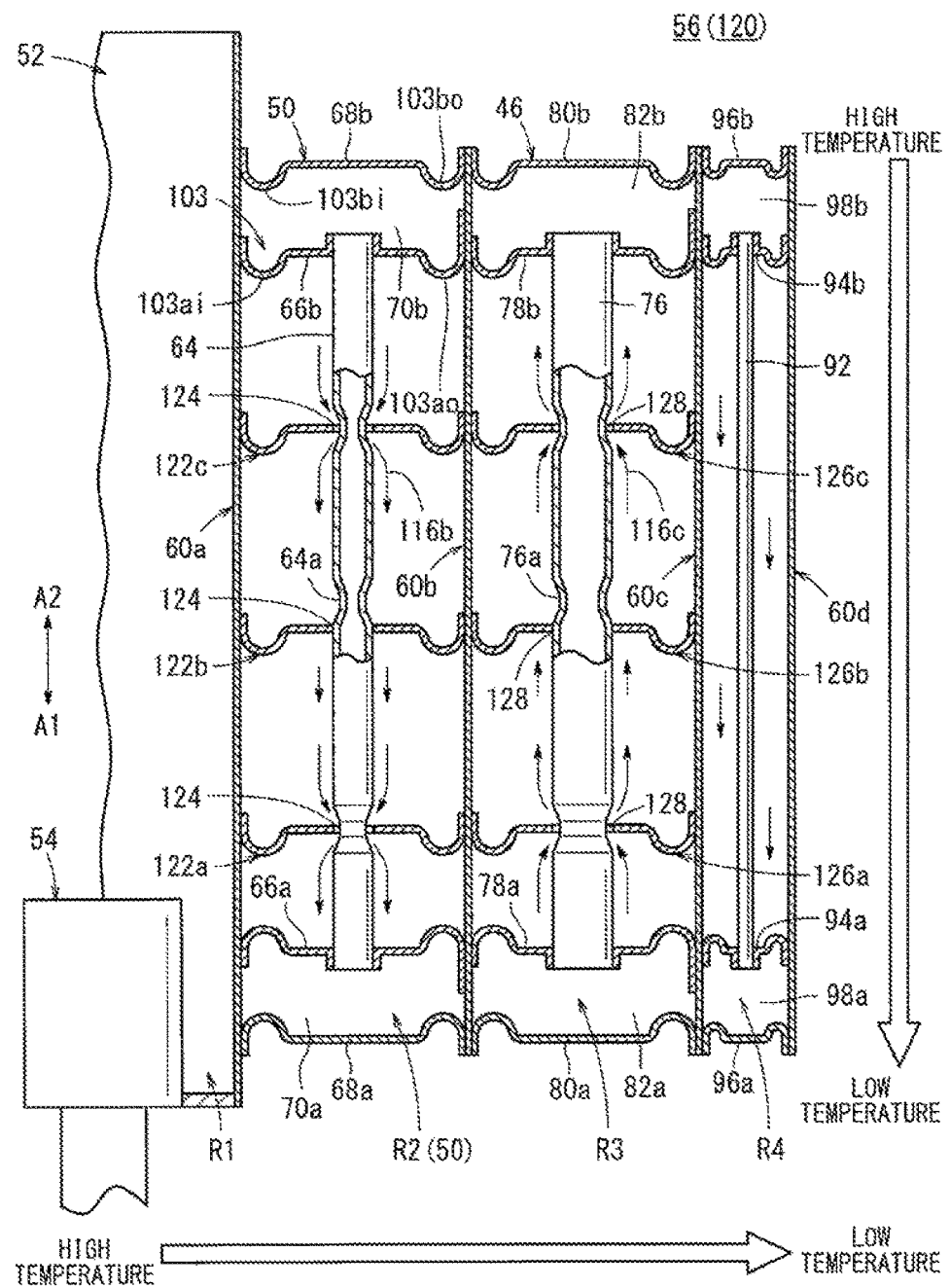
FIG. 12 is a view showing gas flows of a combustion gas in the FC peripheral equipment.
Figure 13:
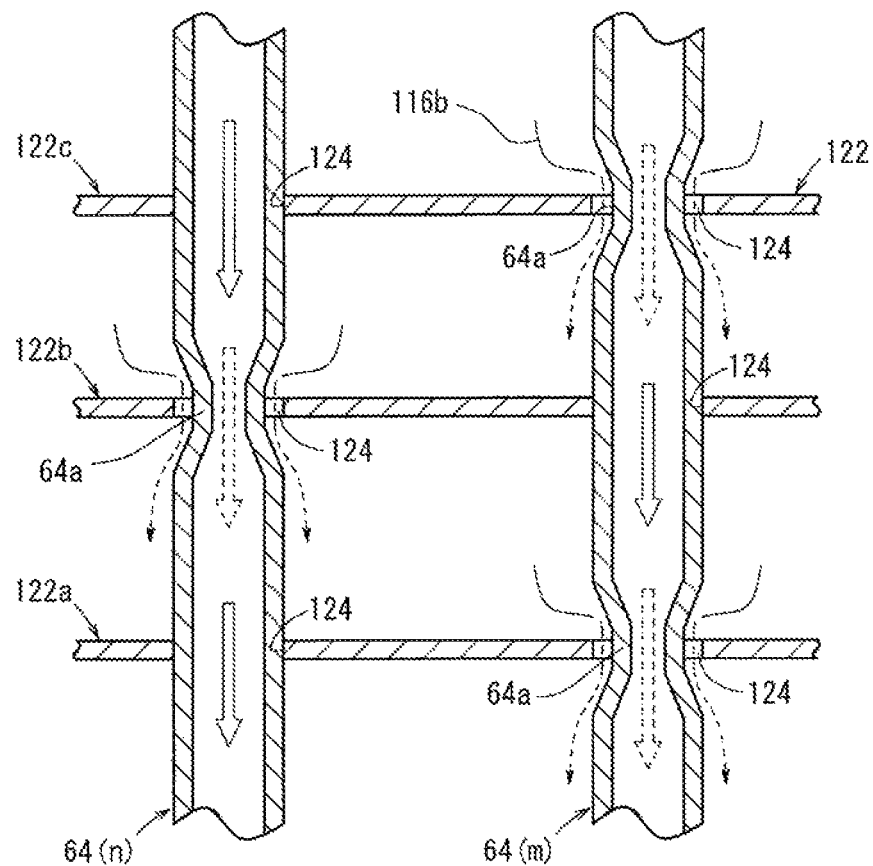
FIG. 13 is a view showing the heat exchange pipes and baffle plates forming a combustion gas detour channel.

As shown in FIGS. 12 and 13, the baffle plates 122a to 122c have combustion gas flow holes 124 corresponding to the respective heat exchange pipes 64. Outer circumferential portions of the heat exchange pipes 64 are fitted to combustion gas flow holes 124 to position the heat exchange pipes 64, and openings are formed in the combustion gas flow holes 124 to flow the combustion gas, around the constricted portions 64a.

Specifically, as shown in FIG. 13, in a certain heat exchange pipe 64(n), a constricted portion 64a is positioned in the central combustion gas flow hole 124 of the baffle plate 122b, and outer circumferential portions of the heat exchange pipe 64(n) are fitted to the upper and lower combustion gas flow holes 124 of the baffle plates 122a, 122c. In another certain heat exchange pipe 64(m), an outer circumferential portion is fitted to the central combustion gas flow hole 124 of the baffle plate 122b, and the constricted portions 64a are positioned in the upper and lower combustion gas flow holes 124 of the baffle plates 122a, 122c. In the structure, the combustion gas flows along the second combustion gas channel 116b in a serpentine pattern.

As shown in FIGS. 11 and 12, at least one, in the second embodiment, three baffle plates 126a, 126b, 126c forming a combustion gas detour channel are provided in the third area R3 (third combustion gas channel 116c) where the reformer 46 is provided, between second inner rings 78a, 78b in a direction perpendicular to the pipe length direction of the reforming pipes 76. Each of the baffle plates 126a to 126c has a substantially ring shape, and the baffle plates 126a to 126c are fixed to the outer circumferential surface of the second partition plate 60b and the inner circumferential surface of the third partition plate 60c. The baffle plates 126a to 126c have the similar structure to the second inner ring 78a.

As shown in FIG. 12, the baffle plates 126a to 126c have combustion gas flow holes 128 corresponding to the reforming pipes 76. The outer circumferential portions of the reforming pipes 76 are fitted to the combustion gas flow holes 128 to position the reforming pipes 76, and openings are formed in the combustion gas flow holes 128 to flow the combustion gas, around the constricted portions 76a. Specifically, the reforming pipe 76 have the similar structure to the heat exchange pipe 64.

Only the baffle plates 122a to 122c or only the baffle plates 126a to 126c may be provided.

In the second embodiment, the baffle plate 122a, 122b, 122c are provided in the second area R2 where the heat exchanger 50 is provided. The combustion gas flow holes 124 corresponding to the heat exchange pipes 64 are formed in the baffle plates 122a to 122c.

In the structure, blow-through of the combustion gas is suppressed suitably, and the channel of the combustion gas is sufficiently long. Specifically, as shown in FIG. 13, the outer circumferential portions and the constricted portions 64a of the heat exchange pipes 64 are provided alternately in the combustion gas flow holes 124 of the baffle plates 122a to 122c.

Therefore, in the second combustion gas channel 116b, the combustion gas does not pass through the baffle plates 122a to 122c straight, and the combustion gas flows in a serpentine pattern. Accordingly, the quantity of the heat passed from the combustion gas to the oxygen-containing gas is increased, and further improvement in the heat exchange efficiency between the combustion gas and the oxygen-containing gas is achieved.

Further, the constricted portion 64a and the combustion gas flow hole 124 are provided at the same position. In the structure, the portion where a turbulent flow is generated in the oxygen-containing gas in the heat exchange pipe 64 and the portion where a turbulent flow is generated in the combustion gas flowing through the combustion gas flow hole 124 are positioned as closely as possible to each other. Accordingly, the quantity of the heat passed from the combustion gas to the oxygen-containing gas is increased to a greater extent, and improvement in the heat exchange efficiency is achieved effectively.

Further, the baffle plates 126a, 126b, 126c are provided in the third area R3 where the reformer 46 is provided, and the baffle plates 126a to 126c have the combustion gas flow holes 128 corresponding to the reforming pipes 76.

In the structure, blow-through of the combustion gas is suppressed suitably, and the channel of the combustion gas is sufficiently long. Therefore, in the third combustion gas channel 116c, the combustion gas does not pass through the baffle plates 126a to 126c straight, and the combustion gas flows in a serpentine pattern. Accordingly, the quantity of the heat passed from the combustion gas to the oxygen-containing gas is increased, and further improvement in the heat exchange efficiency between the combustion gas and the mixed gas is achieved.

Figure 14:
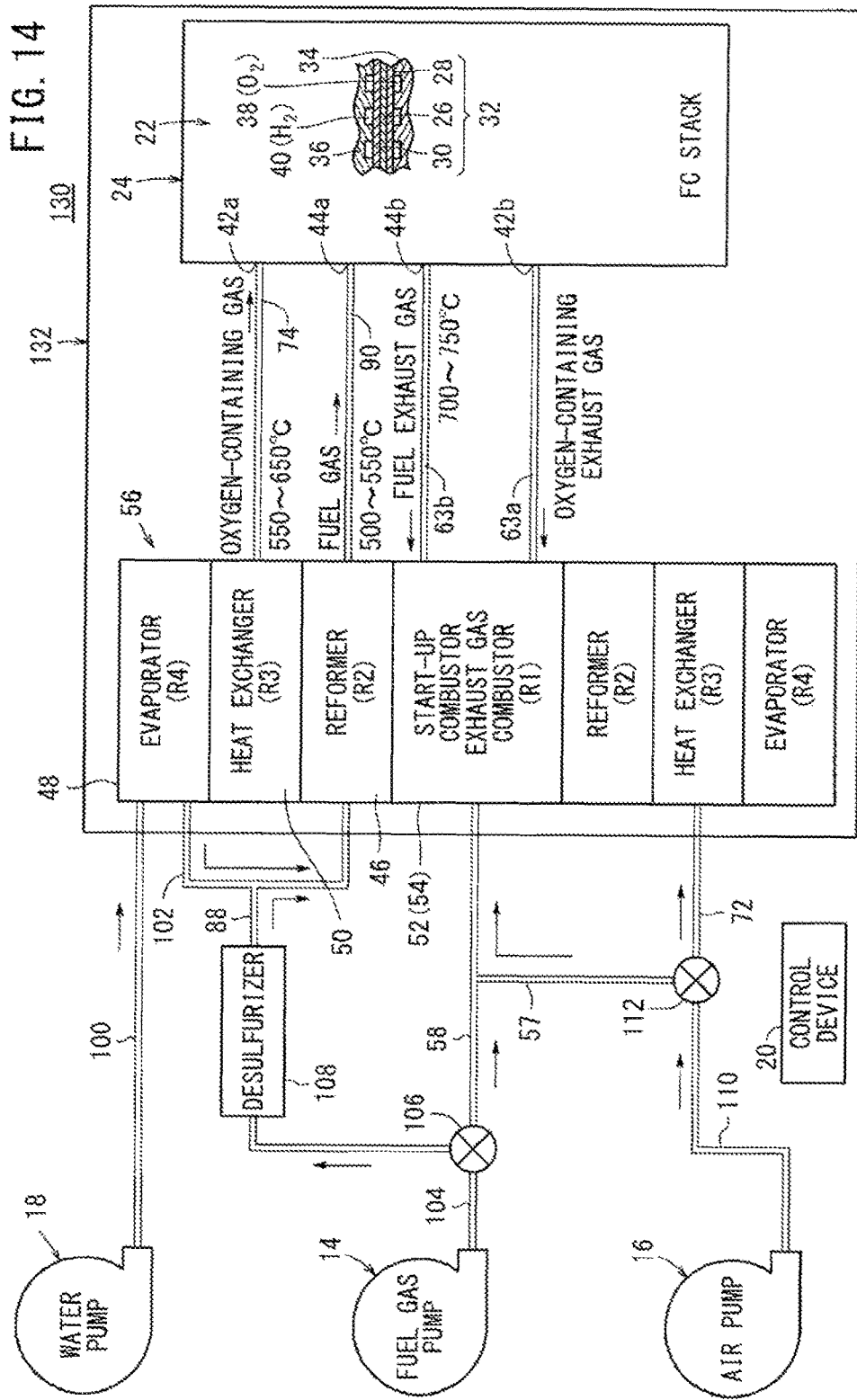
FIG. 14 is a diagram schematically showing structure of a fuel cell system including a fuel cell module according to a third embodiment of the present invention.

As shown in FIG. 14, a fuel cell system 130 includes a fuel cell module 132 according to a third embodiment of the present invention. The constituent elements of the fuel cell module 132 according to the third embodiment of the present invention that are identical to those of the fuel cell module 120 according to the second embodiment are labeled with the same reference numerals, and descriptions thereof will be omitted.

Figure 15:
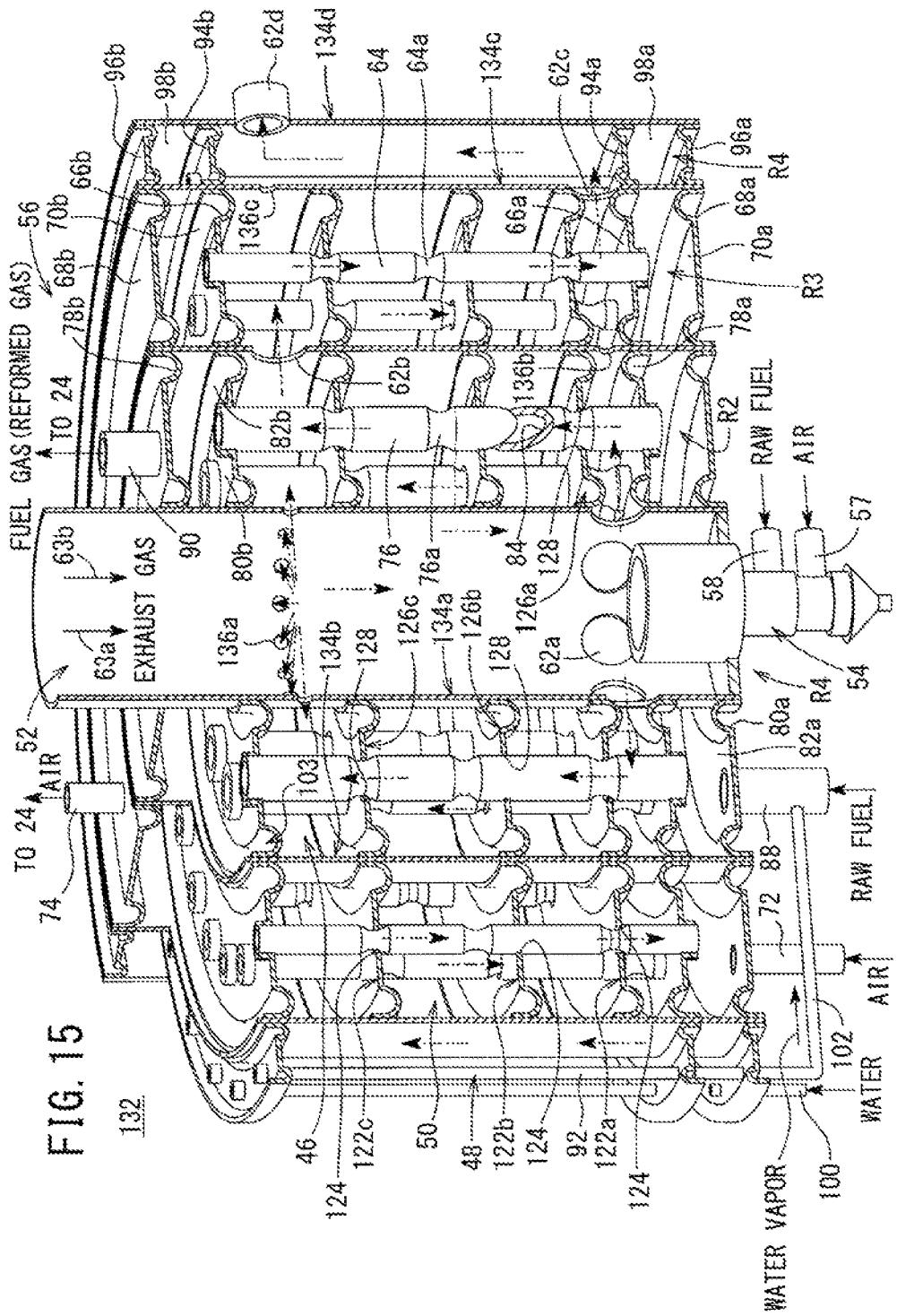
FIG. 15 is a perspective view with partial omission showing FC peripheral equipment of the fuel cell module.

As shown in FIG. 15, FC peripheral equipment 56 of the fuel cell module 132 includes a first area R1 comprising, e.g., a circular opening where an exhaust gas combustor 52 and a start-up combustor 54 are provided, an annular second area R2 around the first area R1 where a reformer 46 is provided, an annular third area R3 around the second area R2 where the heat exchanger 50 is provided, and an annular fourth area R4 around the third area R3 where an evaporator 48 is provided.

The FC peripheral equipment 56 includes a first partition plate 134a provided between the first area R1 and the second area R2, a second partition plate 134b provided between the second area R2 and the third area R3, a third partition plate 134c provided between the third area R3 and the fourth area R4, and a fourth partition plate 134d around the fourth area R4.

Figure 16:
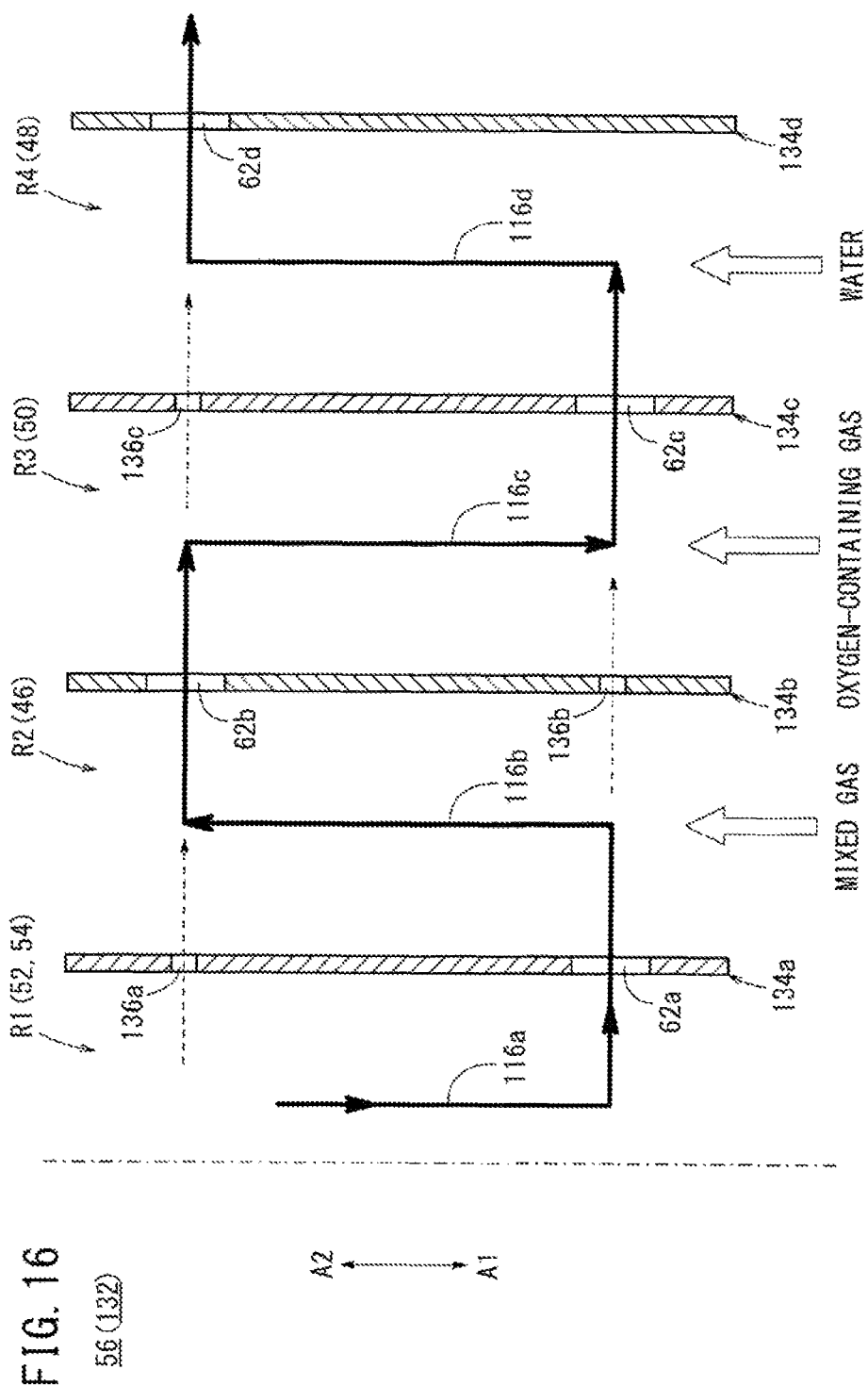
FIG. 16 is a view showing gas flows of a combustion gas in the FC peripheral equipment.

As shown in FIGS. 15 and 16, first combustion gas holes 62a are provided adjacent to the end of the first partition plate 134a opposite to the fuel cell stack 24, second combustion gas holes 62b are provided adjacent to the end of the second partition plate 134b closer to the fuel cell stack 24, third combustion gas holes 62c are provided adjacent to the end of the third partition plate 134c opposite to the fuel cell stack 24, and fourth combustion gas holes 62d are provided adjacent to the end of the fourth partition plate 134d closer to the fuel cell stack 24.

As shown in FIG. 16, a plurality of gas extraction holes 136a are formed in the first partition plate 134a on the side opposite to the first combustion gas holes 62a. Each of the gas extraction holes 136a has an opening which is smaller than that of the first combustion gas holes 62a. The gas extraction holes 136a are formed at positions facing the second combustion gas holes 62b formed in the second partition plate 134b. A plurality of gas extraction holes 136b are formed in the second partition plate 134b at positions facing the third combustion gas holes 62c formed in the third partition plate 134c. A plurality of gas extraction holes 136c are formed in the third partition plate 134c at positions facing the fourth combustion gas holes 62d formed in the fourth partition plate 134d. The gas extraction holes 136b, 136c are not essential, and should be provided as necessary.

As shown in FIG. 15, a plurality of heat exchange pipes 64 are provided in the third area R3 (third combustion gas channel 116c) where the heat exchanger 50 is provided, and at least one of the heat exchange pipes 64 includes at least one constricted portion 64a. In the third area R3, the baffle plates 122a, 122b, 122c are provided adjacent to the inner circumferential surface of the third partition plate 134c.

A plurality of reforming pipes 76 are provided in the second area R2 where the reformer 46 is provided, and at least one of the reforming pipes 76 includes at least one constricted portion 76a. In the second area R2, the baffle plates 126a, 126b, 126c are provided adjacent to the inner circumferential surface of the second partition plate 134b.

In the third embodiment, the fuel cell module 132 includes the first area R1 where the exhaust gas combustor 52 and the start-up combustor 54 are provided, the annular second area R2 around the first area R1 where the reformer 46 is provided, the annular third area R3 around the second area R2 where the heat exchanger 50 is provided, and the annular fourth area R4 around the third area R3 where the evaporator 48 is provided.

In the structure, high temperature equipment with a large heat demand such as the reformer 46 (and the heat exchanger 50) can be provided inside, and low temperature equipment with a small heat demand such as the evaporator 48 can be provided outside. Thus, improvement in the heat efficiency is achieved, and thermally self-sustaining operation is facilitated. Further, simple and compact structure is achieved.

Further, in the heat exchanger 50, transition from the laminar flow to the turbulent flow occurs in the oxygen-containing gas flowing through the heat exchange pipe 64. Accordingly, the quantity of the heat passed from the combustion gas is increased, and improvement in the heat exchange efficiency is achieved suitably. The desired heat exchange efficiency can be achieved under control.

In the reformer 46, transition from the laminar flow to the turbulent flow occurs in the mixed gas flowing through the reforming pipe 76. Accordingly, the quantity of the heat passed from the combustion gas is increased, and improvement in the heat exchange efficiency is achieved suitably.

Figure 17:
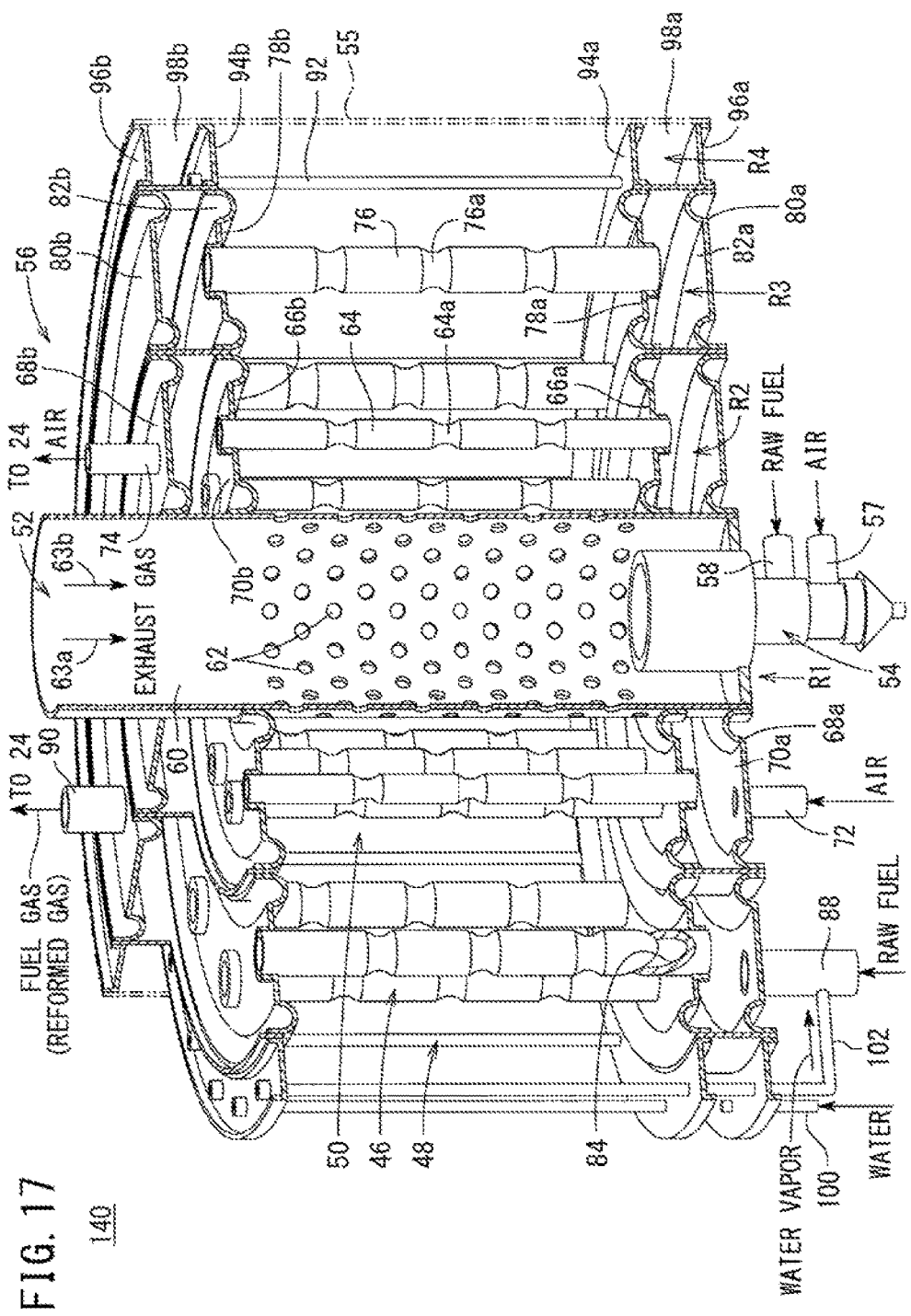
FIG. 17 is a perspective view with partial omission showing FC peripheral equipment of a fuel cell module according to a fourth embodiment of the present invention.

As shown in FIG. 17, in a fuel cell module 140 according to a fourth embodiment of the present invention. The FC peripheral equipment 56 does not include the second partition plate 60b, the third partition plate 60c, and the fourth partition plate 60d. A plurality of combustion gas holes 62 are formed in a partition plate 60 forming the first area R1, in an axial direction and a circumferential direction in a distributed manner.

As with the case of the first embodiment, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

In the fourth embodiment, the same advantages as with the case of the first embodiment are obtained.

Figure 18:
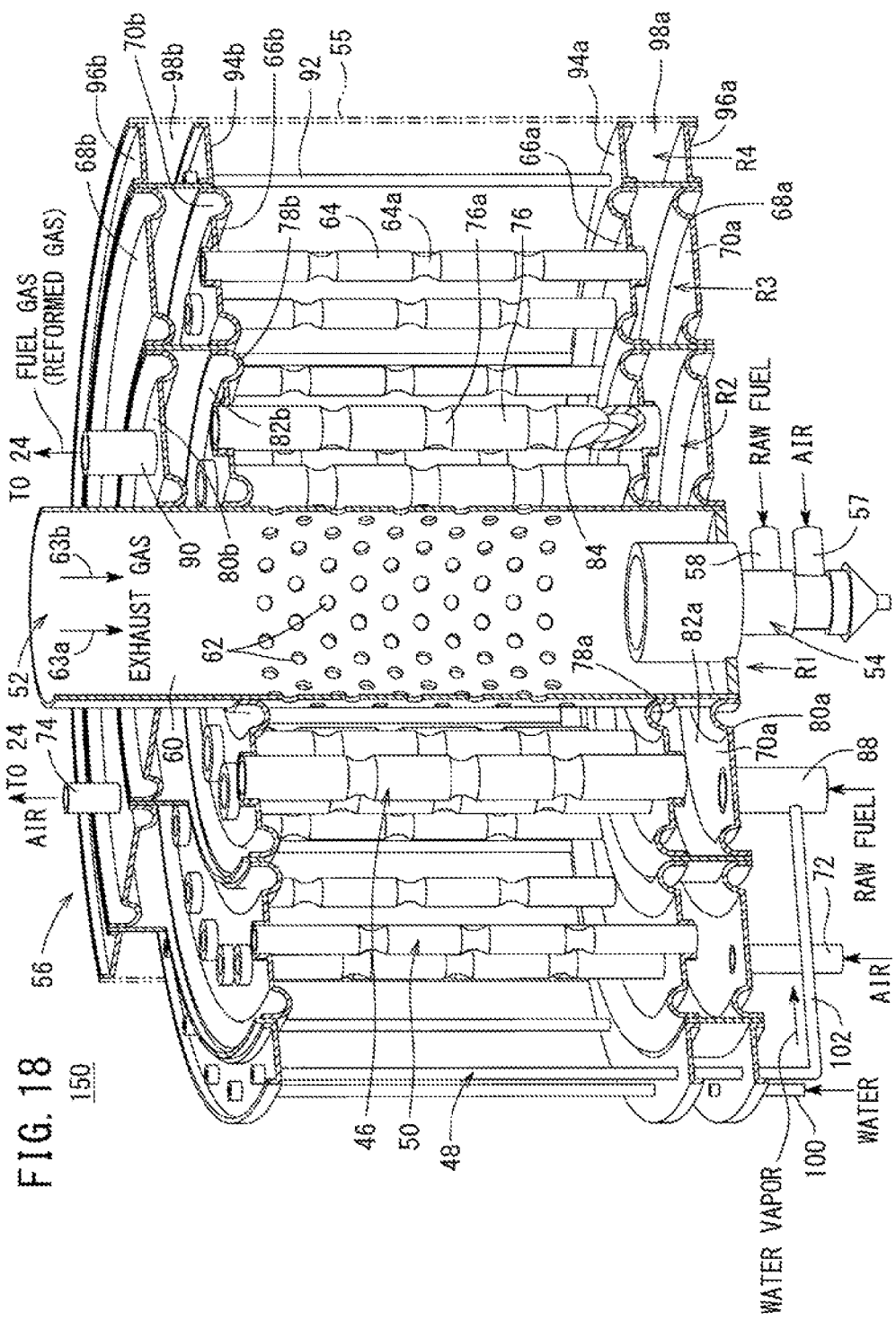
FIG. 18 is a perspective view with partial omission showing FC peripheral equipment of a fuel cell module according to a fifth embodiment of the present invention.

As shown in FIG. 18, in a fuel cell module 150 according to a fifth embodiment of the present invention, as with the case of the second embodiment, the FC peripheral equipment 56 includes a first area R1 comprising, e.g., a circular opening where the exhaust gas combustor 52 and the start-up combustor 54 are provided, an annular second area R2 formed around the first area R1 where the reformer 46 is provided, an annular third area R3 formed around the second area R2 where the heat exchanger 50 is provided, and an annular fourth area R4 formed around the third area R3 where the evaporator 48 is provided.

In the fifth embodiment, the same advantages as with the case of the second embodiment are obtained.

In the first to fifth embodiments, the outer and annular circumferential portions of the heat exchange pipes 64 and the reforming pipes 76 are subjected to a constricting treatment to form constricted portions 64a, 76a each having a circular shape in cross section. However, the present invention is not limited in this respect.

Figure 19:
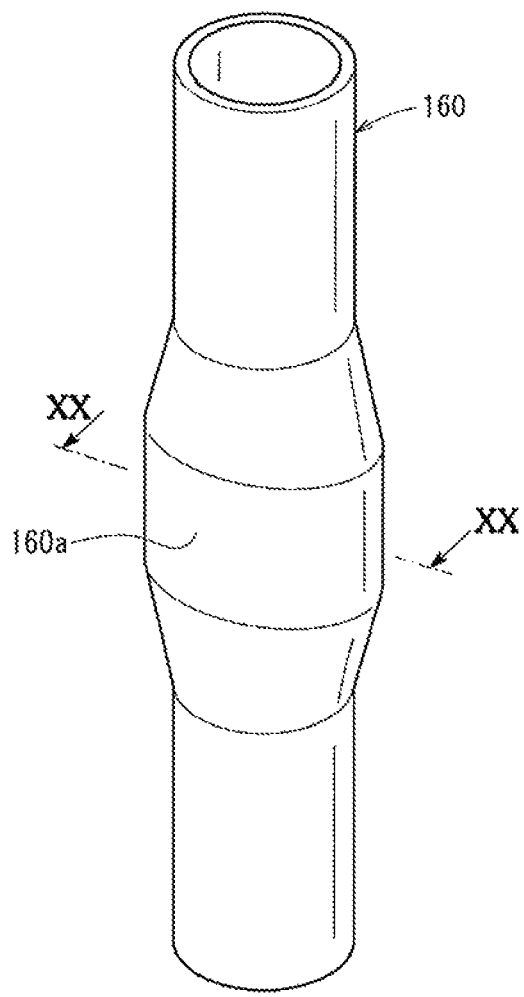
FIG. 19 is a view showing another pipe.
Figure 20:
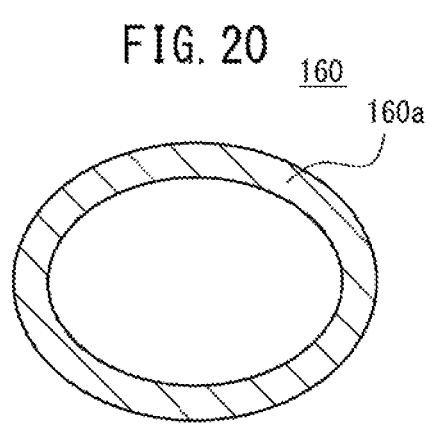
FIG. 20 is a cross sectional view showing the other pipe, taken along a line XX-XX in FIG. 19.

For example, a pipe (heat exchange pipe or reforming pipe, or both of the heat exchange pipe and reforming pipe) 160 shown in FIG. 19 has an annular shape. By collapsing the outer circumferential portion of the pipe, a constricted portion 160a having an oval shape in cross section is provided (see FIG. 20).

Figure 21:
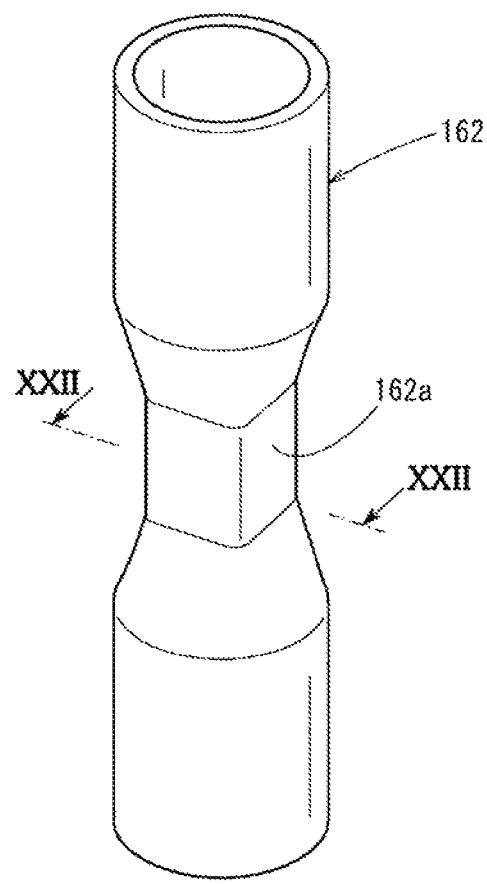
FIG. 21 is a view showing still another pipe.
Figure 22:
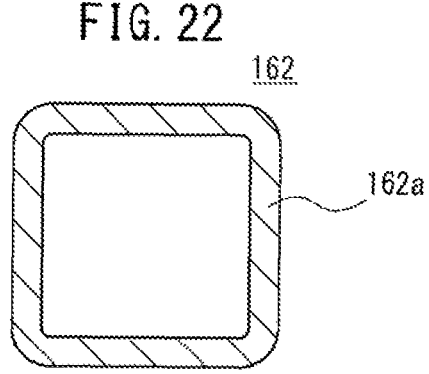
FIG. 22 is a cross sectional view showing the still other pipe taken along a line XXII-XXII in FIG. 21.
Figure 23:
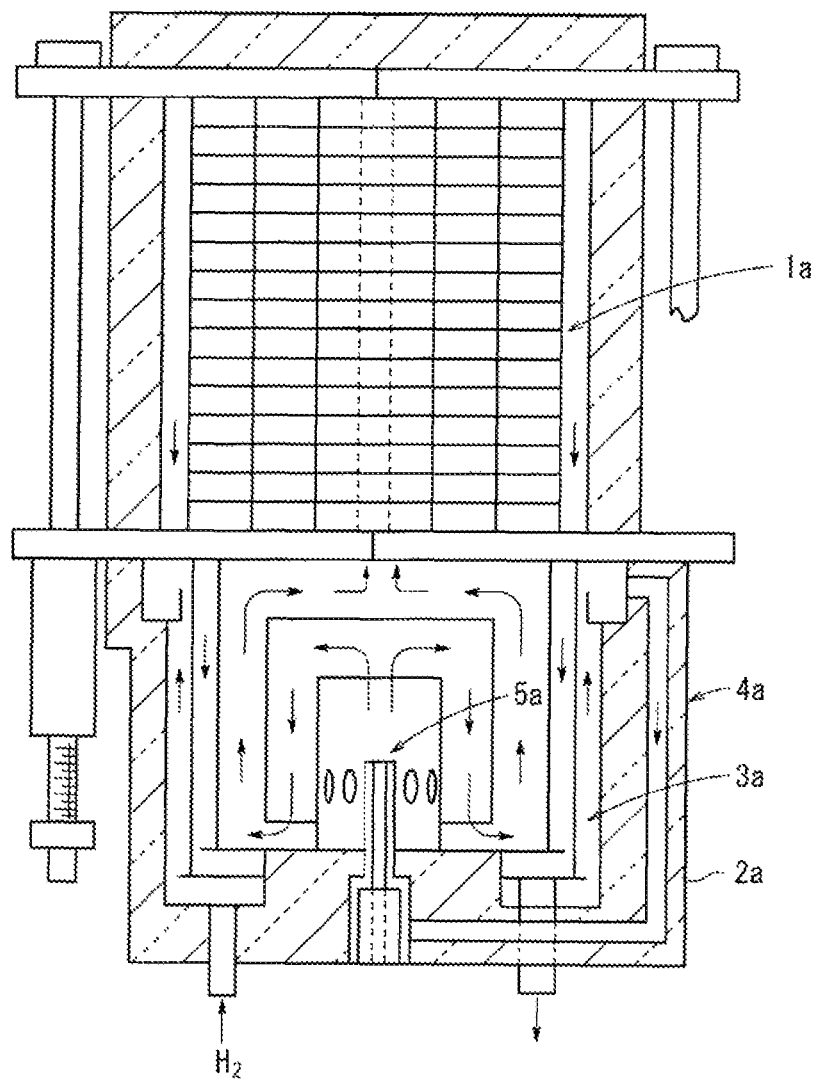
FIG. 23 is a view schematically showing a fuel cell battery disclosed in the conventional technique 1.
Figure 24:
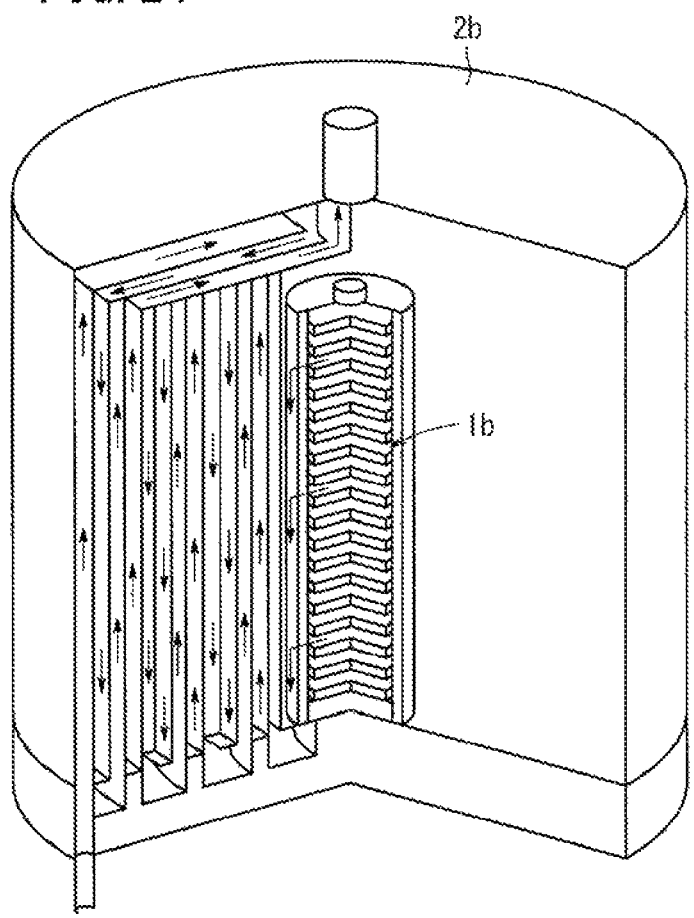
FIG. 24 is a perspective view with partial cutout showing a solid oxide fuel cell disclosed in the conventional technique 2.
Figure 25:
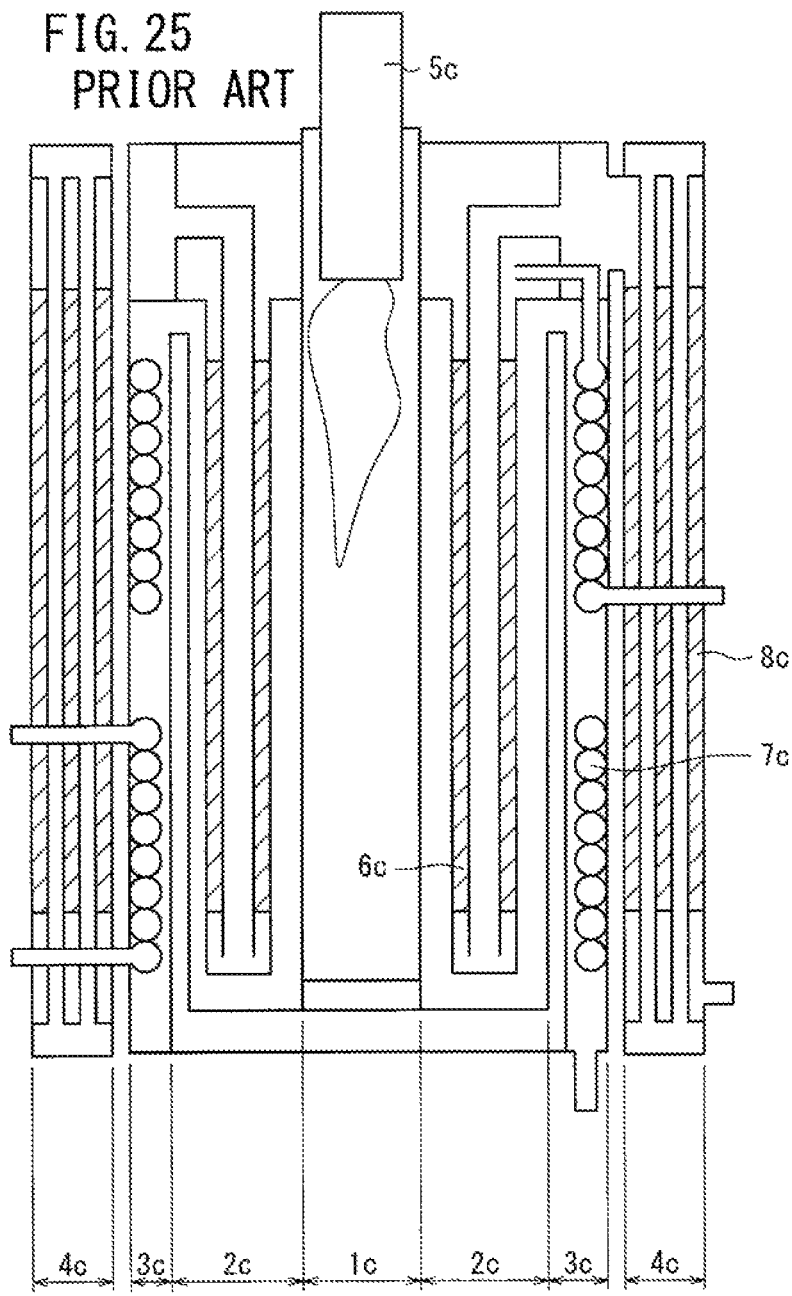
FIG. 25 is a view schematically showing a fuel cell system disclosed in the conventional technique 3.

Further, a pipe (heat exchange pipe or reforming pipe, or both of the heat exchange pipe and the reforming pipe) 162 shown in FIG. 21 has an annular shape. By shaping or forming the outer circumferential portion, a constricted portion 162a having a quadrilateral shape in cross section is provided (see FIG. 22).

Using the pipes 160, 162 having the above structure as the heat exchange pipes 64 or the reforming pipes 76, similar advantages are obtained.

Further, the heat exchange pipe 64 and the reforming pipe 76 may have protrusions protruding toward the inside of the heat exchange pipe 64 and the reforming pipe 76 to provide portions where the pipe diameter is changed or the pipe cross sectional area is changed. In this case, the outer shapes of the heat exchange pipe 64 and the reforming pipe 76 have a uniform cylindrical shape having the constant diameter over the entire length.

Although certain embodiments of the present invention have been shown and described in detail, it should be understood that various changes and modifications may be made to the embodiments without departing from the scope of the invention.

The invention claimed is:

1. A fuel cell module comprising:
   a fuel cell stack formed by stacking a plurality of fuel cells for generating electricity by electrochemical reactions of a fuel gas and an oxygen-containing gas;
   a reformer for reforming a mixed gas of water vapor and a raw fuel containing hydrocarbon to produce the fuel gas supplied to the fuel cell stack;
   an evaporator for evaporating water, and supplying the water vapor to the reformer;
   a heat exchanger for raising a temperature of the oxygen-containing gas by heat exchange with a combustion gas, and supplying the oxygen-containing gas to the fuel cell stack;
   an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
   a start-up combustor for combusting the raw fuel and the oxygen-containing gas to produce the combustion gas,
   wherein the fuel cell module includes:
   a first area where the exhaust gas combustor and the start-up combustor are provided;
   an annular second area around the first area where one of the reformer and the heat exchanger is provided;
   an annular third area around the second area where another of the reformer and the heat exchanger is provided; and
   an annular fourth area around the third area where the evaporator is provided;
   and wherein the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes connected to the oxygen-containing gas supply chamber at one end, and connected to the oxygen-containing gas discharge chamber at another end, and a combustion gas channel for supplying the combustion gas to a space between the heat exchange pipes; and at least one of the heat exchange pipes includes at least one portion where a pipe diameter is changed or a pipe cross sectional area is changed, a shape of the at least one portion being such that the oxygen-containing gas transitions from a laminar flow to a turbulent flow.

2. The fuel cell module according to claim 1, wherein the reformer includes an annular mixed gas supply chamber to which the mixed gas is supplied, an annular reformed gas discharge chamber to which the produced fuel gas is discharged, a plurality of reforming pipes connected to the mixed gas supply chamber at one end, and connected to the reformed gas discharge chamber at another end, and a combustion gas channel for supplying the combustion gas to a space between the reforming pipes; and at least one of the reforming pipes includes at least one portion where a pipe diameter is changed or a pipe cross sectional area is changed, a shape of the at least one portion being such that the mixed gas transitions from a laminar flow to a turbulent flow.

3. The fuel cell module according to claim 1, wherein the at least one portion where the pipe diameter is changed or the pipe cross sectional area is changed comprises at least any of portions provided in different phases in a pipe length direction, or a portion provided spirally in a direction along a circumference of the pipe.

4. The fuel cell module according to claim 1, wherein the at least one portion where the pipe diameter is changed or the pipe cross sectional area is changed is provided in an entrance segment of fluid in a pipe.

5. The fuel cell module according to claim 1, further comprising a first partition plate provided between the first area and the second area, a second partition plate provided between the second area and the third area, and a third partition plate provided between the third area and the fourth area, wherein the first partition plate has a first combustion gas hole for allowing combustion gas to flow through the first area and the second area, the second partition plate has a second combustion gas hole for allowing combustion gas to flow through the second area and the third area, and the third partition plate has a third combustion gas hole for allowing the combustion gas to flow through the third area and the fourth area.

6. The fuel cell module according to claim 5, wherein a baffle plate forming a combustion gas detour channel is provided in the combustion gas channel in a direction perpendicular to a pipe length direction.

7. The fuel cell module according to claim 6, wherein a combustion gas flow hole is formed between the baffle plate forming the combustion gas detour channel and an outer circumferential portion of any one or more of pipes.

8. The fuel cell module according to claim 7, wherein at least one or more of pipes have the at least one portion where the pipe diameter is changed or the pipe cross sectional area is changed, and the combustion gas flow hole is provided at a position corresponding to the at least one portion where the pipe diameter is changed or the pipe cross sectional area is changed.

9. The fuel cell module according to claim 1, wherein the fuel cell module is a solid oxide fuel cell module.

* * * * *